US009779110B2

(12) United States Patent
Ishikawa

(10) Patent No.: US 9,779,110 B2
(45) Date of Patent: Oct. 3, 2017

(54) PLACEMENT DEVICE, PLACEMENT METHOD AND RECORDING MEDIUM, THAT STORES PLACEMENT PROGRAM INFORMATION PROCESSING DEVICE

(71) Applicant: NEC Corporation, Tokyo (JP)

(72) Inventor: Kenichiro Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/324,779

(22) PCT Filed: Jul. 6, 2015

(86) PCT No.: PCT/JP2015/003383
§ 371 (c)(1),
(2) Date: Jan. 9, 2017

(87) PCT Pub. No.: WO2016/006223
PCT Pub. Date: Jan. 14, 2016

(65) Prior Publication Data
US 2017/0205810 A1    Jul. 20, 2017

(30) Foreign Application Priority Data

Jul. 11, 2014   (JP) .................................. 2014-143324

(51) Int. Cl.
G06F 17/30       (2006.01)
G06F 3/06        (2006.01)
(Continued)

(52) U.S. Cl.
CPC ........... *G06F 17/302* (2013.01); *B65G 1/137* (2013.01); *G05B 19/4189* (2013.01);
(Continued)

(58) Field of Classification Search
CPC .................................................. G06F 17/302
See application file for complete search history.

(56) References Cited

U.S. PATENT DOCUMENTS 7,716,180 B2 * 5/2010 Vermeulen ........ G06F 17/30212
707/626
8,171,059 B2 * 5/2012 Nagashima ........... G06F 3/0625
707/802
(Continued)

FOREIGN PATENT DOCUMENTS

JP     2013025497 A      2/2013
JP     2013061739 A      4/2013
WO     WO-2012/023384 A1 2/2012

OTHER PUBLICATIONS

International Search Report corresponding to PCT/JP2015/003383, dated Oct. 6, 2015 (1 page).

*Primary Examiner* — Thomas Randazzo
(74) *Attorney, Agent, or Firm* — Wilmer Cutler Pickering Hale and Dorr LLP

(57) ABSTRACT

A placement device may reduce the cost for placing an object when a placement destination, in which an object is placed, changes due to the addition of a placement destination. A placement device may: determine, upon receiving object information assigned to an object, as the placement destination in which the object is placed from among one or more placement destinations each having an assigned set value, the placement destination added most recently and assigned a set value larger than a characteristic value derived uniquely based on the object information; and change, when a placement destination is added, based on an available capacity representing the amount of objects that can be newly placed in the placement destinations, the set value assigned to at least one of the placement destinations such that the determined placement destination does not change to a placement destination other than the placement destination added last.

18 Claims, 11 Drawing Sheets

(51) Int. Cl.
*G05B 19/418* (2006.01)
*B65G 1/137* (2006.01)
*G06F 12/00* (2006.01)

(52) U.S. Cl.
CPC .......... *G06F 3/0643* (2013.01); *G06F 3/0646* (2013.01); *G06F 12/00* (2013.01); *G06F 17/3053* (2013.01); *G06F 17/30575* (2013.01)

(56) References Cited

U.S. PATENT DOCUMENTS

| | | | | |
|---|---|---|---|---|
| 8,495,336 | B2* | 7/2013 | Fukutomi | G06F 12/0246 711/162 |
| 8,521,983 | B2* | 8/2013 | Ogihara | G06F 3/061 711/170 |
| 8,832,113 | B2* | 9/2014 | Tamura | G06F 17/30699 707/747 |
| 9,158,808 | B2* | 10/2015 | Ishikawa | G06F 3/0607 |
| 9,317,221 | B2* | 4/2016 | Ishikawa | G06F 3/0659 |
| 9,659,048 | B2* | 5/2017 | Ding | G06F 17/30336 |
| 2014/0019683 | A1* | 1/2014 | Ishikawa | G06F 17/302 711/114 |
| 2015/0019574 | A1* | 1/2015 | Ishikawa | G06F 17/30595 707/752 |
| 2015/0100822 | A1* | 4/2015 | Ohno | G06F 3/0634 714/6.32 |
| 2016/0335108 | A1* | 11/2016 | Ryu | G06F 9/45558 |
| 2016/0350021 | A1* | 12/2016 | Matsushita | G06F 12/0873 |

* cited by examiner

Fig. 4

| IDENTIFIER OF PLACEMENT DESTINATION | ORDER | PARAMETER | MAXIMUM VALUE OF PARAMETER |
|---|---|---|---|
| A | 1 | 1 | 1 |
| B | 2 | 0.48 | 0.5 |
| C | 3 | 0.32 | 0.33 |
| ⋮ | | | |

Fig. 7

| IDENTIFIER | Server 0 | Server 1 | Server 2 | Server 3 | Server 4 | Server 5 |
|---|---|---|---|---|---|---|
| ORDER | 1 | 2 | 3 | 4 | 5 | 6 |
| VALUE COMPARISON | P>R | P<R | P<R | P>R | P>R | P<R |
| PLACEMENT DESTINATION OF OBJECT | | | | ○ | ○ | |
| PLACEMENT DESTINATION CANDIDATE | ○ | | | | ○ | |

PLACEMENT DEVICE, PLACEMENT METHOD AND RECORDING MEDIUM, THAT STORES PLACEMENT PROGRAM INFORMATION PROCESSING DEVICE

CROSS-REFERENCE TO RELATED APPLICATIONS

This application is a national stage application of International Application No. PCT/JP2015/003383 entitled "PLACEMENT DEVICE, PLACEMENT METHOD, AND RECORDINGMEDIUM THAT STORES PLACEMENT PROGRAM" filed on Jul. 6, 2015, which claims the benefit of the priority of Japanese Patent Application No. 2014-143324, filed on Jul. 11, 2014, the disclosures of each of which are hereby incorporated by reference in their entirety.

TECHNICAL FIELD

The present invention relates to a technology of determining a placement destination of an object.

BACKGROUND ART

In order to retrieve an object placed in one of a plurality of placement destinations, the placement destination in which the object is placed needs to be specified. A placement destination in which an object is placed includes, for example, a storage device, a storage medium, a place, and a physical location. For example, by storing an object and a relation (relevance) with a placement destination in which the object is placed, the placement destination in which the object is placed can be specified. When a placement destination in which an object is placed cannot be specified quickly, it is difficult to access the object quickly. When storing all relations between objects and placement destinations in which the objects are placed, increase in the number of objects entails increase in storage capacity required for storing the relations between the objects and the placement destinations. When a vast number of objects are placed, a vast number of relations need to be stored. Additionally, the stored vast number of relations need to be maintained not to be lost. In order to store the vast number of relations, a cost of a storage device storing the vast number of relations is required. Maintaining the stored vast number of relations without losing the relations requires a yet higher cost.

A method of specifying a placement destination in which an object is placed without storing a relation between the object and the placement destination of the object includes, for example, a method of uniquely determining the placement destination of the object on the basis of an identifier of the object and the like.

An example of a device using such a technology is disclosed, for example, in PTL 1. The device according to PTL 1 generates a pseudorandom number by using an identifier of an object as a seed. The pseudorandom number is determined uniquely to the seed. Further, a generation probability of the pseudorandom number is uniform throughout a value range of the pseudorandom number. The device according to PTL 1 determines a placement destination related to a range of values including the generated pseudorandom number, as a placement destination of the object, on the basis of a table storing a relation between a range of values and a placement destination. The device according to PTL 1 repeats generation of a pseudorandom number until a pseudorandom number included in a range of values related to a placement destination is generated.

CITATION LIST

Patent Literature

[PTL 1] PCT International Application Publication No. WO2012/023384

SUMMARY OF INVENTION

In the technology in PTL 1, a placement destination is not determined unless a pseudorandom number included in a range of values associated with a placement destination is generated. In that case, the device according to PTL 1 repeats, for example, update of a seed in accordance with a predetermined method and generation of a pseudorandom number using the updated seed until the generated pseudorandom number is included in a range of values associated with a placement destination. Consequently, a time required for the device according to PTL 1 to determine a placement destination is not fixed. A time for the device according to PTL 1 to determine a placement destination may be extended by chance. Furthermore, when a placement destination, being determined in accordance with a rule, in which an object is placed is changed by addition of a placement destination, the device according to PTL 1 relocates the object.

One of objects of the present invention is to provide a placement device and the like that are capable of reducing a processing cost related to placement of an object when a placement destination, being determined in accordance with a rule, in which the object is placed is changed by addition of a placement destination.

Solution to Problem

A placement device according to one aspect of the present invention includes: determination means for determining, upon receiving object information assigned to an object, a placement destination in which the object is placed from among one or more placement destinations to each of which a set value is assigned, the placement destinations being available for placing the object, the placement destination being added latest among the placement destinations to each of which the set value not smaller than a characteristic value is assigned, the characteristic value being uniquely derived based on the object information; and change means for changing, when an placement destination is added, the set value assigned to at least one of the placement destination based on free capacities available for placing objects newly in the placement destinations so that the placement destination to be determined does not change to other than the placement destination added latest, the free capacity representing an amount of the objects.

A placement method according to one aspect of the present invention includes: determining, upon receiving object information assigned to an object, a placement destination in which the object is placed out of one or more placement destinations to each of which a set value is assigned, the placement destinations being available for placing the object, the placement destination being added latest among the placement destinations to each of which the set value larger than a characteristic value is assigned, the characteristic value being uniquely derived based on the object information; and changing, when an placement destination is added, the set value assigned to at least one of the placement destination based on free capacities available for placing objects newly in the placement destinations so that the placement destination to be determined does not change to other than the placement destination added latest, the free capacity representing an amount of the objects.

A storage medium according to one aspect of the present invention stores a placement program causing a computer to operate as: determination means for determining, upon receiving object information assigned to an object, a placement destination in which the object is placed out of one or more placement destinations to each of which a set value is assigned, the placement destinations being available for placing the object, the placement destination being added latest among the placement destinations to each of which the set value larger than a characteristic value is assigned, the characteristic value being uniquely derived based on the object information; and change means for changing, when an placement destination is added, the set value assigned to at least one of the placement destination based on free capacities available for placing objects newly in the placement destinations so that the placement destination to be determined does not change to other than the placement destination added latest, the free capacity representing an amount of the objects. The present invention may also be provided by a storage medium that stores the aforementioned placement program.

Advantageous Effects of Invention

The present invention provides an effect that a processing cost related to placement of an object can be reduced when a placement destination, being determined in accordance with a rule, in which the object is placed is changed by addition of a placement destination.

BRIEF DESCRIPTION OF DRAWINGS

FIG. 4 is a diagram schematically representing an example of order and the like stored in a placement destination information storage unit 103 according to the first example embodiment.

FIG. 7 is a diagram schematically representing a result of determination and the like by a determination unit 101 according to the first example embodiment.

DESCRIPTION OF EMBODIMENTS

Next, example embodiments of the present invention will be described in detail with reference to the drawings. The example embodiments described below do not limit the invention according to claims. Further, not all combinations of configurations described in the example embodiments are essential to the configuration of the invention.

<First Example Embodiment>

Figure 1:
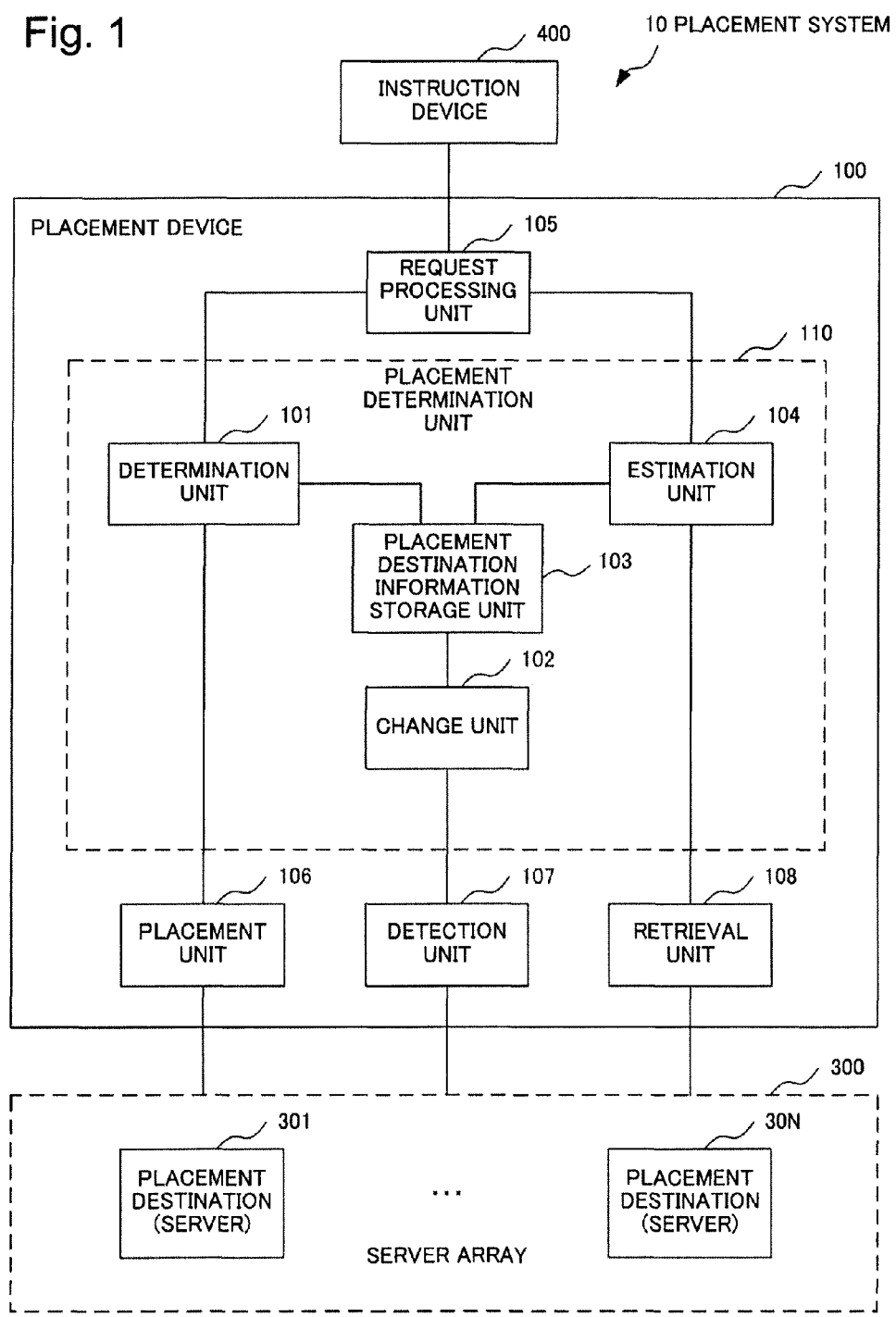
FIG. 1 is a block diagram representing a configuration of a placement system 10 according to a first example embodiment of the present invention.

First, a placement system 10 according to a first example embodiment of the present invention will be described in detail with reference to drawings. FIG. 1 is a block diagram illustrating a configuration of the placement system 10 according to the present example embodiment. With reference to FIG. 1, the placement system 10 according to the present example embodiment includes a placement device 100 and one or more servers (servers 301 to 30N). The servers 301 to 30N are referred to as a server array 300 in FIG. 1. The placement device 100 and each of the servers are communicably connected with each other. In the description below, each of the servers is also referred to as a placement destination. That is to say, the servers 301 to 30N are also referred to as placement destinations 301 to 30N, respectively. The placement device 100 is further communicably connected to an instruction device 400.

Each of the placement destinations (i.e. each of the placement destinations 301 to 30N) includes, for example, a storage area in which an object can be placed. Each of the placement destinations stores an object into the storage area in response to a placement request described later. Each of the placement destinations retrieves, in response to a retrieval request described later, an object stored in a storage area. Then, each of the placement destinations sends the retrieved object to a transmission source of the retrieval request.

The object is, for example, a chunk of data (i.e. a data set). Object information is assigned to an object. The object information is, for example, an identifier of an object. The object information may include, for example, an attribute representing a property of an object and the like. The object information may include an identifier of an object. The object information may be information unique to an object.

In the example embodiments of the present invention, identical object information is assigned to objects treated as an identical object even when contents of the objects are updated. Further, different pieces of object information are assigned to objects treated as different objects. Additionally, when objects treated as an identical object are placed in a placement destination a plurality of times, the object having been placed in the placement destination is replaced with the object placed latest.

In the present example embodiment, a placement destination may be increased by, for example, an operation by an administrator of the placement system 10. Increase of a placement destination is performed by, for example, adding a placement destination one by one. Further, increase of a placement destination is also performed by, for example, increasing a storage area of the placement destination added latest. A storage area of a placement destination other than the placement destination added latest is not increased. In the example embodiments of the present invention, "adding a placement destination" represents at least either of increasing the number of placement destinations and increasing a free capacity in the placement destination added latest. The free capacity in a placement destination is a value representing an object amount that can be newly placed in the placement destination. For example, when sizes of objects are identical, the object amount may be represented by the number of objects. The object amount may be represented by a size of objects.

The instruction device 400 transmits to the placement device 100 a placement request that is a request for placing an object in any one of the placement destinations. The placement request is, for example, a predetermined signal. For example, in addition to a placement request, the instruction device 400 may transmit to the placement device 100 the object placement of which is requested by the placement request. The instruction device 400 may transmit an object as a placement request to the placement device 100. In other words, the instruction device 400 may request placement of an object by transmitting the object to the placement device 100.

The instruction device 400 further transmits to the placement device 100 a retrieval request that is a request for retrieving an object placed in any one of the placement destinations. The retrieval request is, for example, a predetermined signal. For example, in addition to a retrieval request, the instruction device 400 may transmit to the placement device 100 an identifier and object information of an object retrieval of which is requested by the retrieval request. The instruction device 400 may transmit to the placement device 100, as a retrieval request, an identifier and object information of an object retrieval of which is requested. In other words, the instruction device 400 may request retrieval of an object by transmitting an identifier and object information of the object. Additionally, when object information is an identifier of an object, the instruction device 400 may request retrieval of the object by transmitting the identifier of the object.

The placement device 100 includes a determination unit 101, a change unit 102, a placement destination information storage unit 103, an estimation unit 104, a request processing unit 105, a placement unit 106, a detection unit 107, and a retrieval unit 108. In the example illustrated in FIG. 1, a placement determination unit 110 included in the placement device 100 includes the determination unit 101, the change unit 102, the placement destination information storage unit 103, and the estimation unit 104.

The request processing unit 105 receives a placement request and a retrieval request, which are described above, from the instruction device 400. When receiving a placement request, the request processing unit 105 transmits to the placement determination unit 110 a placement destination determination instruction that is an instruction to determine a placement destination in which the received object is placed, and object information of the received object. The determination unit 101 included in the placement determination unit 110 receives the transmitted placement destination determination instruction and the transmitted object information of the object. The determination unit 101 determines a placement destination uniquely to the received object information and placement destinations at the time of receiving the placement destination determination instruction. The determination unit 101 will be described in detail later.

The placement unit 106 places an object, placement of which is instructed by the placement instruction, in a placement destination determined by the determination unit 101. The placement unit 106 may receive from the determination unit 101 the placement instruction, an identifier of the placement destination determined by the determination unit 101, and the object to be placed in the placement destination. When placement of the object is performed, the placement unit 106 may transmit a response representing successful placement of the object to the instruction device 400 through the request processing unit 105.

When the request processing unit 105 receives a retrieval request, the request processing unit 105 transmits a placement destination estimation instruction and received object information to the placement determination unit 110. The placement destination estimation instruction is an instruction to estimate a candidate of a placement destination in which an object to which the received object information is assigned is placed. The estimation unit 104 included in the placement determination unit 110 receives the placement destination estimation instruction and the object information which are transmitted. On the basis of the object information received and order in which placement destinations are added, the estimation unit 104 estimates a placement destination candidate that is a placement destination which has a possibility that an object to which the object information is assigned is placed within. The estimation unit 104 may further specify a placement destination in which the object to which the received object information is assigned is placed from among placement destinations included in placement destination candidates. The estimation unit 104 may further specify a placement destination added latest from among placement destinations in which the object to which the received object information is assigned is placed. The estimation unit 104 will be described in detail later. The estimation unit 104 may transmit an identifier of a specified placement destination to the retrieval unit 108 through, for example, the request processing unit 105. The estimation unit 104 may transmit to the retrieval unit 108 the identifier of the specified placement destination, the identifier of the object, and the retrieval request. The estimation unit 104 may transmit a data value representing an estimated placement destination candidate to the retrieval unit 108 through, for example, the request processing unit 105. The estimation unit 104 may transmit to the retrieval unit 108 a data value representing the estimated placement destination candidate, the identifier of the object, and the retrieval request.

When receiving an identifier of a placement destination, being specified by the estimation unit 104, in which an object to which the received object information is assigned is placed, the retrieval unit 108 may request retrieval of the object to the placement destination. Alternatively, the retrieval unit 108 may request retrieval of the object to each of the placement destinations estimated as placement destination candidates by the estimation unit 104. The retrieval unit 108 may select a placement destination, for example, in descending order of addition, i.e. in order starting from the placement destination added latest from among placement destinations estimated as placement destination candidates. Then, the retrieval unit 108 may transmit to the selected placement destination an identifier of the object, retrieval of which is requested, and a retrieval request of the object specified by the identifier. The placement destination receiving the identifier of the object and the retrieval request may determine whether or not the object specified by the received identifier is placed in the placement destination. A placement destination in which the object specified by the received identifier is placed may send the object to the retrieval unit 108. A placement destination in which the object specified by the received identifier is not placed may transmit a response indicating that the object is not placed to the retrieval unit 108. When receiving an object from a placement destination, the retrieval unit 108 may send the object to the instruction device 400 through, for example, the request processing unit 105.

The retrieval unit 108 may transmit the identifier of the object and a request for confirming whether the object exists or not to each of the placement destination candidates. In that case, the placement destinations may perform processing of confirming whether or not the object specified by the received identifier is placed within. Then, the placement destination may transmit to the retrieval unit 108 a response indicating whether or not the object is placed within. The retrieval unit 108 may transmit the identifier of the object and a retrieval request to the placement destination transmitting a response indicating that the object is placed within.

The instruction device 400 may transmit to the placement device 100 a deletion request for deleting an object in a placement destination from the placement destination. In that case, the instruction device 400, for example, transmits, to the request processing unit 105, an identifier of the object to be deleted, object information of the object, and a deletion request. In that case, the request processing unit 105 and the retrieval unit 108 operate similarly to the case when a retrieval request is received. However, in this case, a request transmitted to a placement destination is a deletion request. Further, the object specified by the identifier is deleted by the placement destination in which the object is placed.

The detection unit 107 specifies a server operating as a placement destination. Then, the detection unit 107 obtains, from each specified placement destination, a free capacity in the placement destination. The detection unit 107 further detects addition of a placement destination. Specifically, the detection unit 107 detects increase in the number of placement destinations and increase in a storage area in the placement destination added latest. The detection unit 107 may transmit, to the change unit 102 included in the placement determination unit 110, for example, an identifier of a placement destination detected to be newly added. The detection unit 107 may, for example, store the identifier of the detected placement destination newly added, in a manner that order of addition of each of the placement destinations can be specified, in the placement destination information storage unit 103. The detection unit 107 transmits obtained information representing a free capacity in each of the placement destinations to the change unit 102. The detection unit 107 may store obtained information representing a free capacity in each of the placement destinations in the placement destination information storage unit 103. Information representing a free capacity in descriptions of the example embodiments of the present invention may also be simply referred to as a free capacity. For example, "obtaining a free capacity" represents obtaining information representing a free capacity.

Next, the determination unit 101, the change unit 102, the placement destination information storage unit 103, and the estimation unit 104 included in the placement determination unit 110 will be described.

For example, upon receiving a placement destination determination instruction and object information, the determination unit 101 determines a placement destination in which the object is placed from among one or more placement destinations in which the object is able to be placed. For example, the determination unit 101 specifies, on the basis of a free capacity in each of the placement destinations, a placement destination determined by a rule uniquely determining a placement destination in which an object is placed on the basis of a combination of the aforementioned one or more placement destinations and object information assigned to the object. The rule is, for example, a procedure of processing, performed using an object, of associating the object information with one of the one or more placement destinations described above. The determination unit 101 determines the determined placement destination to be a placement destination in which the object is placed.

Specifically, the determination unit 101 first calculates, for each of the placement destinations, a characteristic value that is a value uniquely determined on the basis of a placement destination and object information assigned to an object. The determination unit 101 associates the characteristic value uniquely determined on the basis of the placement destination and the object information assigned to the object with the placement destination.

The characteristic value derived by the determination unit 101 may be, for example, a value distributed uniformly or almost uniformly between a lower limit and an upper limit of the characteristic values for various possible pieces of object information. The characteristic value is, for example, a hash of data into which object information and a server number are concatenated. In that case, the determination unit 101 may derive a hash of data, into which object information and a server number are concatenated, by using a predetermined hash function that generates a hash. The server number is a number assigned to a placement destination and is unique to the placement destination. The server number may indicate, for example, a number in sequence of placement destinations that are added to the placement system 10. The server number may be an identifier of a placement destination. In the following description, the server number may also be referred to as a placement destination number.

The characteristic value may be, for example, a value of a pseudorandom number derived by using object information as a seed value. In that case, the determination unit 101 may initialize a predetermined pseudorandom-number generation function that generates a pseudorandom number by using object information as a seed value. The pseudorandom-number generation function may be a function that generates an identical pseudorandom number sequence when initialized by use of a same seed. Then, the determination unit 101 may generate pseudorandom numbers by using the pseudorandom-number generation function. In that case, the determination unit 101 may generate, for example, pseudorandom numbers the number of which is the same as the number of placement destinations. Then, the determination unit 101 may associate a generated pseudorandom number with a placement destination as a characteristic value, for example, in order of a sequence of added placement destinations. When a placement destination exists in an initial state in which an object is not placed in the placement destination, a turn in order of addition may also be determined in advance for the placement destination existing in the initial state. When placement destinations exist in an initial state, different turns in order of addition may also be determined for the placement destinations.

Further, a parameter, that is a value derived by the change unit 102 on the basis of a free capacity in the placement destination, is assigned to each of the placement destinations. The parameter of each of the placement destinations is stored in, for example, the placement destination information storage unit 103. In the description below, the parameter may also be referred to as a "set value." Derivation of a parameter by the change unit 102 will be described in detail later.

The determination unit 101 determines a placement destination added latest among placement destinations to each of which the characteristic value derived on the basis of the object information is larger than the assigned parameter to be a placement destination in which an object to which the object information is assigned is placed. The determination unit 101 transmits an identifier of the determined placement destination to the placement unit 106. The aforementioned rule represents, for example, determining a placement destination, which is added latest among those to each of which a set value larger than a characteristic value uniquely derived on the basis of object information assigned to an object is assigned to be a placement destination in which the object is placed. The rule is specifically fixed by a set value assigned to each of the placement destinations. As will be described in detail later, change of a rule by the change unit 102 is performed by changing a set value on the basis of a free capacity in a placement destination.

The change unit 102 changes a rule of determining a placement destination, for example, upon addition of a placement destination. The change unit 102 may change a rule of determining a placement destination upon detecting, by the detection means 107, addition of a placement destination. The change unit 102 may change a rule of determining a placement destination every time when an object is placed. The change unit 102 may change a rule of determining a placement destination every time when an object is deleted from a placement destination. The change unit 102 changes a rule so that a placement destination, being determined in accordance with the rule, in which an object is placed does not change, by change of the rule, to a placement destination other than the placement destination added latest. Specifically, the change of a rule is, for example, change of a set value assigned to at least one placement destination.

The change unit 102 will be described more in detail below.

When the placement system 10 starts an operation, the change unit 102 first receives from, for example, the detection unit 107 a free capacity in each of the placement destinations existing when the placement system 10 starts the operation. The change unit 102 calculates a parameter provided for each of the placement destinations on the basis of a free capacity representing an amount of object that can be newly placed in each of the placement destinations. Specifically, the change unit 102 successively selects one placement destination from among placement destinations. The change unit 102 calculates a parameter on the basis of a free capacity in the selected placement destination and the sum of the free capacity in the selected placement destination and a free capacity in a placement destination added before the selected placement destination is added. The change unit 102 calculates a parameter so that a lower limit of the parameter is equal to the lower limit of the aforementioned characteristic value and the upper limit of the characteristic value is smaller than an upper limit of the parameter. The upper limit of a parameter may be, for example, a minimum value that can be handled by the change unit 102 among values larger than the upper limit of the characteristic value. The change unit 102 assigns the calculated parameter to the selected placement destination. The change unit 102 may store the calculated value into the placement destination information storage unit 103 as a parameter associated with the selected placement destination. The change unit 102 may further store the parameter into the placement destination information storage unit 103 as a maximum value of the parameter associated with the selected placement destination. The change unit 102 repeats selection of a placement destination and calculation of a parameter until all the parameters assigned to the placement destinations are calculated.

A value of a parameter may have a larger value as a free capacity in a selected placement destination becomes larger. Additionally, a value of a parameter may become smaller as the sum of the free capacity in the selected placement destination and a free capacity in a placement destination added before the selected placement destination is added becomes larger. When a range of possible values of a characteristic value is larger than or equal to 0 and smaller than 1, a parameter may be a value obtained by dividing a free capacity in the selected placement destination by the sum of the free capacity in the selected placement destination and a free capacity in a placement destination added before the selected placement destination is added. In the description below, a value obtained by dividing a free capacity in a selected placement destination by the sum of the free capacity in the selected placement destination and a free capacity in a placement destination added before the selected placement destination is added is referred to as a normal parameter. When an upper limit and a lower limit of possible value of a characteristic value are not 1 and 0, respectively, the change unit 102 may calculate a value obtained by multiplying a normal parameter by the difference between the aforementioned upper limit and the aforementioned lower limit. The change unit 102 may calculate a value obtained by further adding the lower limit to the calculated value as a parameter.

Furthermore, when a predetermined event occurs, the change unit 102 similarly calculates a parameter of each of the placement destinations. The event is, for example, addition of a placement destination. The event may be placement of an object. The event may be deletion of an object. The event may be another event. The event may be a combination of a plurality of events. Additionally, when any of a plurality of predetermined events occurs, the change unit 102 may similarly calculate a parameter of each of the placement destinations. The change unit 102 updates a parameter of each of the placement destinations and a maximum value of the parameter, which are stored in the placement destination information storage unit 103. Specifically, for each of the placement destinations, the change unit 102 replaces a parameter which is stored in the placement destination information storage unit 103 and is associated with a placement destination with a parameter of the placement destination calculated, for example, due to occurrence of an event. Additionally, for each of the placement destinations, when the calculated parameter of the placement destination is larger than the maximum value of the parameter associated with the placement destination, the change unit 102 replaces the maximum value of the parameter with the calculated parameter.

The placement destination information storage unit 103 stores a parameter for each of the placement destinations. The placement destination information storage unit 103 stores information by which order in which each of the placement destinations is added can by specified. The placement destination information storage unit 103 may store a free capacity in each of the placement destinations. The placement destination information storage unit 103 further stores a maximum value of a parameter for each of the placement destinations.

Upon receiving, for example, a placement destination estimation instruction and object information, the estimation unit 104 estimates a placement destination candidate possibly storing an object provided with the object information, for example, as follows.

The estimation unit 104 first calculates a characteristic value on the basis of received object information according to the same method as that of the determination unit 101. In other words, a characteristic value calculated by the estimation unit 104 for a combination of object information and a placement destination is identical to a characteristic value calculated by the determination unit 101 for the same combination of the object information and the placement destination. As described above, the determination unit 101 calculates, for example, a hash of data into which object information and a server number are concatenated as a characteristic value. In that case, for each of the placement destinations, the estimation unit 104 calculates, for example, a hash of data into which received object information and a server number of the placement destination are concatenated as a characteristic value of the placement destination. As described above, the determination unit 101 may assign, for example, pseudorandom numbers, which are generated by a pseudorandom number generation function initialized by using object information as a seed, to placement destinations in order of addition as characteristic values. In that case, the estimation unit 104 may similarly assign pseudorandom numbers, which are generated by use of the same pseudorandom number generation function initialized by using object information as a seed, to the placement destinations in order of addition as characteristic values.

As described above, a characteristic value is a value uniquely determined on the basis of object information and a placement destination. In other words, the determination unit 101 and the estimation unit 104 always calculate an identical characteristic value when a combination of object information and a placement destination is the same. As described above, the determination unit 101 determines a placement destination associated with a parameter larger than a characteristic value, and added latest, as a placement in which an object is placed. Accordingly, when a characteristic value calculated on the basis of an object provided for an object and a placement destination is smaller than a maximum value of a parameter associated with the placement destination, the object is possibly placed in the placement destination. The estimation unit 104 determines, to be placement destination candidates, all placement destinations whose calculated characteristic values are smaller than the maximum values, which is stored in the placement destination information storage unit 103, of the parameters. The estimation unit 104 transmits the placement destination candidates to the retrieval unit 108. The estimation unit 104 may transmit an identifier of each of the placement destinations included in the placement destination candidates.

Next, an operation of the placement device 100 according to the present example embodiment will be described in detail with reference to drawings.

Figure 2:
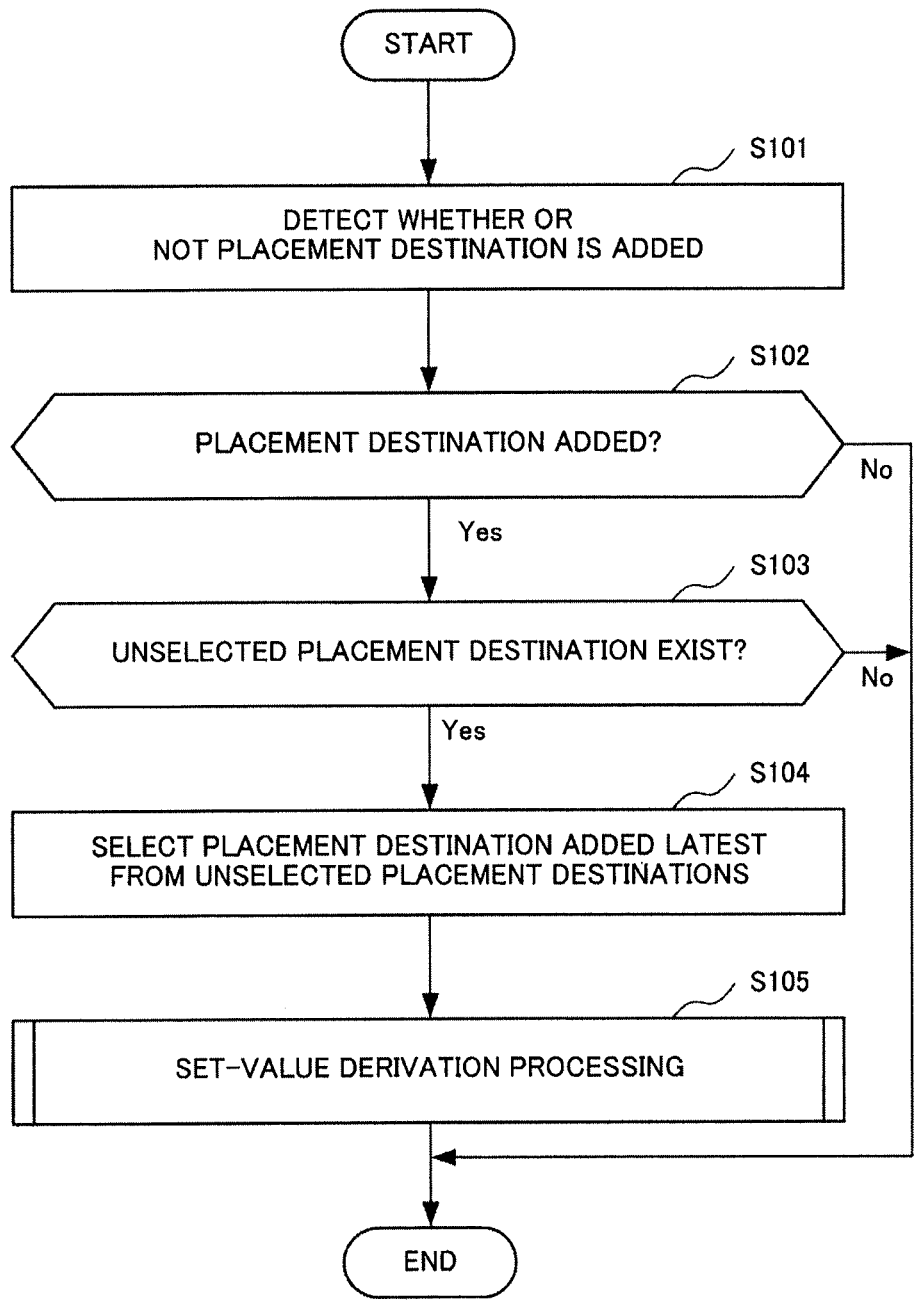
FIG. 2 is a flowchart representing an operation example of a placement device 100 according to the first example embodiment when a placement destination is added.

FIG. 2 is a flowchart illustrating an operation example of the placement device 100 according to the present example embodiment when a placement destination is added. The placement device 100 may, for example, periodically perform the operation illustrated in FIG. 2.

First, the detection unit 107 detects whether or not a placement destination is added (Step S101). The detection unit 107 may detect placement destinations in operation. Then, when placement destinations in operation increase, the detection unit 107 may detect addition of a placement destination. The detection unit 107 obtains an identifier of an added placement destination from, for example, the added placement destination. The detection unit 107 further obtains information representing a free capacity from each of the placement destinations. In that case, each of the placement destinations may be configured to transmit information representing an identifier and a free capacity in response to a request from the detection unit 107 for transmission of information representing an identifier and a free capacity. The detection unit 107 stores the identifier of the added placement destination into the placement destination information storage unit 103 through the change unit 102 in a manner that order of addition can be specified. The detection unit 107 may store a free capacity in each of the placement destinations into the placement destination information storage unit 103 through the change unit 102. The detection unit 107 may detect addition of a placement destination when an amount of objects that can be placed in the placement destination added latest increases. In that case, the detection unit 107 does not need to store the identifier of the added placement destination into the placement destination information storage unit 103. As described above, in the present example embodiment, the number of placement destinations increases by 1. Further, a storage area in the placement destination added latest may increase. However, a number of placement destinations does not decrease. Further, a storage area in a placement destination other than the placement destination added latest does not increase. An administrator adding a placement destination may notify the detection unit 107 of the identifier of the added placement destination by, for example, operating a terminal device unillustrated.

In a case where addition of a placement destination is not detected (No in Step S102), the placement device 100 ends the operation illustrated in FIG. 2. In a case where addition of a placement destination is detected (Yes in Step S102), when all placement destinations are selected and an unselected placement destination does not exist (No in Step S103), the placement device 100 ends the operation illustrated in FIG. 2. When an unselected placement destination exists (Yes in Step S103), the change unit 102 selects a placement destination. The change unit 102 may select, for example, a placement destination added latest among unselected placement destinations (Step S104). The change unit 102 derives a parameter by performing set-value derivation processing on the selected placement destination (Step S105). The set-value derivation processing will be described in detail below.

According to the present example embodiment, even when a placement destination, being determined by the determination unit 101 as described later, in which an object is placed changes by, for example, addition of a placement destination or the like, an object previously placed in a placement destination does not need to be moved to a changed placement destination.

Figure 3:
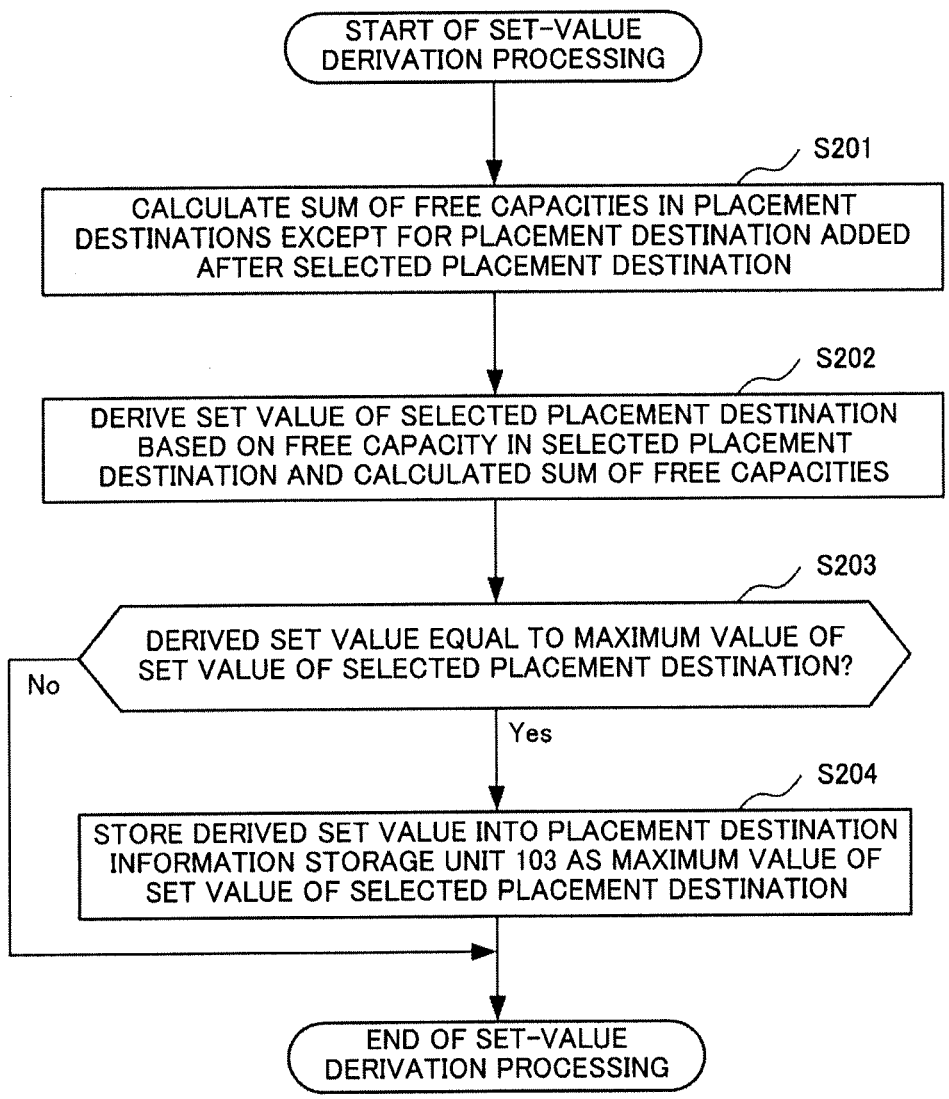
FIG. 3 is a flowchart representing an operation example of set-value derivation processing by the placement device 100 according to the first example embodiment.

FIG. 3 is a flowchart illustrating an operation example of set-value derivation processing by the placement device 100 according to the present example embodiment. Referring to FIG. 3, the change unit 102 first calculates the sum of a free capacity in a selected placement destination and a free capacity in a placement destination added before the selected placement destination. In other words, the change unit 102 calculates the sum of free capacities in all placement destinations except for a placement destination added after the selected placement destination (Step S201). The change unit 102, for example, derives a set value of the selected placement destination, that is, a parameter, on the basis of the free capacity in the selected placement destination and the sum of the free capacities calculated in Step S201, as described above (Step S202). The change unit 102 stores the parameter derived in Step S202 into the placement destination information storage unit 103 as a parameter of the selected placement destination. The change unit 102 may store, for example, a combination of the parameter derived in Step S202 and an identifier of the selected placement destination into the placement destination information storage unit 103. The change unit 102 compares the parameter derived in Step S202 with the maximum value, being stored in the placement destination information storage unit 103, of the parameter of the selected placement destination. When the derived parameter is not equal to the maximum value of the parameter of the selected placement destination (No in Step S203), the placement device 100 ends the operation illustrated in FIG. 3. When the derived parameter is equal to the maximum value of the parameter of the selected placement destination (Yes in Step S203), the change unit 102 updates the maximum value, being stored in the placement destination information storage unit 103, of the parameter of the selected placement destination (Step S204). Specifically, the change unit 102 may store the parameter derived in Step S202 into the placement destination information storage unit 103 as the maximum value of the parameter of the selected placement destination.

FIG. 4 is a diagram schematically illustrating an example of order and the like stored in the placement destination information storage unit 103 according to the present example embodiment. In the example illustrated in FIG. 4, for each of the placement destinations, an identifier, order, a parameter, and a maximum value of the parameter are stored in the placement destination information storage unit 103 in a mutually associated state. In the example illustrated in FIG. 4, a parameter is included in a range between 0 and 1. The parameter of the first placement destination in the order is maximum among parameters of all the placement destinations.

An example of a parameter calculation procedure will be described below. The change unit 102 may calculate a parameter in accordance with the following procedure. The change unit 102 may calculate a parameter according to a procedure other than the following procedure. In equations described below, "x" denotes an operator representing multiplication, and "÷" denotes an operator representing division.

Step 1: For each of the placement destinations, calculate $A_j$ that is a value obtained by dividing a free capacity by a maximum free capacity in all placement destinations. $A_j$ denotes a value obtained by dividing a free capacity in a j-th placement destination by a maximum free capacity value.

Step 2: Calculate the sum of $A_j$ for all the placement destinations. Calculate the reciprocal B of the calculated sum.

Step 3: Substitute 1 for a variable C.

Step 4: Select a placement destination j added latest.

Step 5: Calculate $A_j \times B \div C$ as a parameter $P_j$ of the selected placement destination j.

Step 6: Calculate $C \times (1-P_j)$. Substitute the calculated value for C.

Step 7: When the selected placement destination is first in the order, end the procedure.

Step 8: Select a placement destination added immediately before the selected placement destination (i.e. decrease j by 1), and return to Step 5.

When the minimum value of the parameter is denoted by D, and the maximum value is denoted by E, $P_j$ calculated in Step 5 becomes $A_j \times B \div C \times (E-D)+D$.

As described above, when a placement destination is added, the change unit 102 may calculate a parameter of each of the placement destinations.

The change unit 102 may calculate a parameter of each of the placement destinations when an object is placed in any of the placement destinations. The change unit 102 may calculate a parameter of each of the placement destinations before the determination unit 101 determines a placement destination in which an object is placed. The change unit 102 may calculate a parameter of each of the placement destinations before the estimation unit 104 estimates a candidate of a placement destination in which an object is placed. Further, when calculating a parameter, in a case where a parameter in a placement destination does not change, the change unit 102 may not calculate a parameter of the placement destination.

Next, an operation of determining a placement destination in which an object is placed, by the placement device 100 according to the present example embodiment, will be described in detail with reference to drawings.

Figure 5:
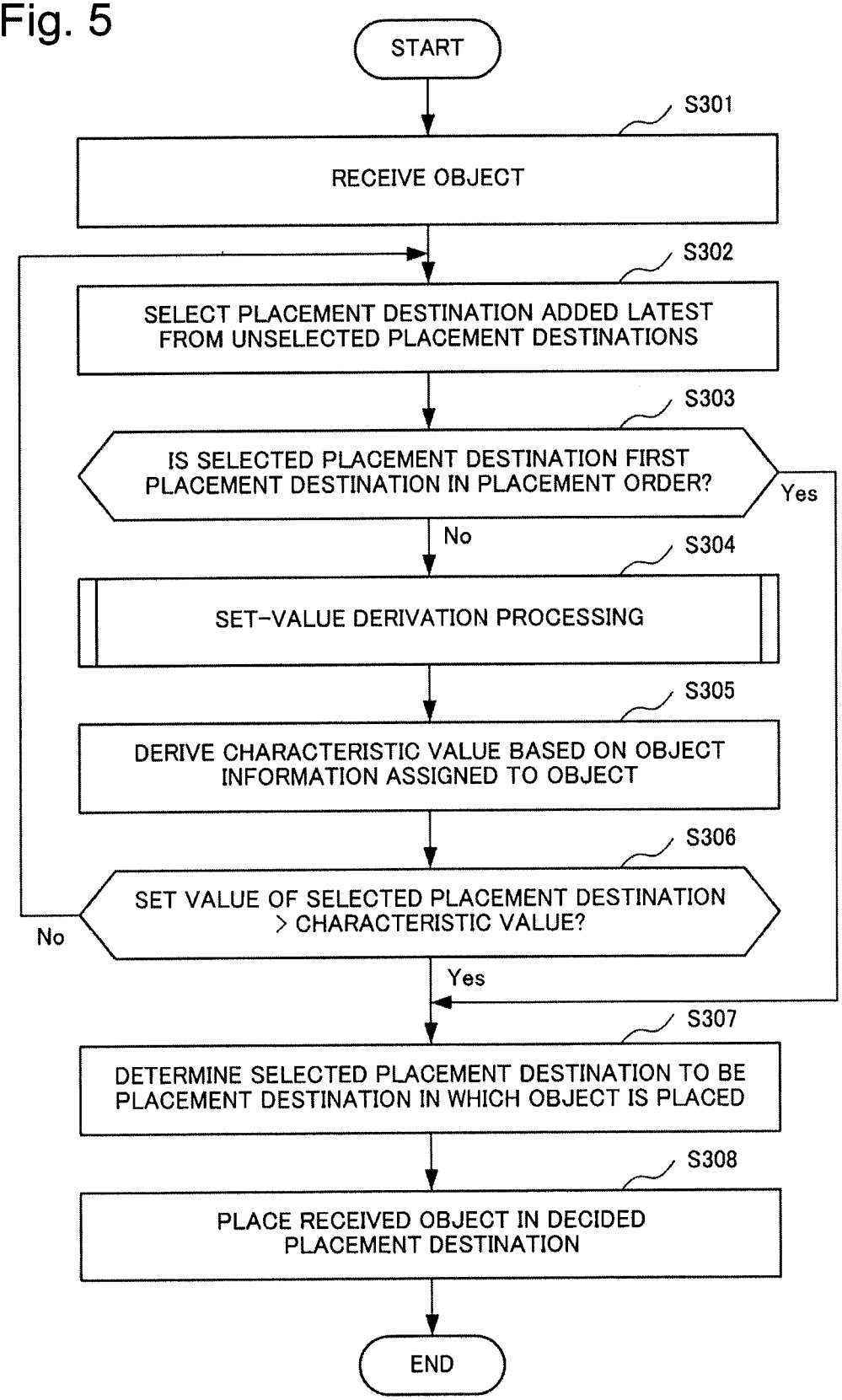
FIG. 5 is a flowchart representing an operation example of determining a placement destination in which an object is placed by the placement device 100 according to the first example embodiment.

FIG. 5 is a flowchart illustrating an operation example of determination of a placement destination in which an object is placed, by the placement device 100 according to the present example embodiment. In the operation example illustrated in FIG. 5, the placement device 100 determines a parameter of a placement destination before determining a placement destination in which an object is placed.

Referring to FIG. 5, first, the request processing unit 105 receives an object and a placement instruction from the instruction device 400 (Step S301). Object information, such as an attribute of the object and an identifier of the object, is assigned to the object which is received. The instruction device 400 may transmit the object information in addition to the object. The request processing unit 105 may receive the object information in addition to the object. The request processing unit 105 that receives the placement request, the object, and the object information transmits a placement destination determination instruction and the object information to the determination unit 101. When the determination unit 101 receives the placement destination determination instruction, none of placement destinations are yet selected. As described above, in the operation example illustrated in FIG. 5, the change unit 102 determines a parameter of a placement destination before the determination unit 101 determines a placement destination in which an object is placed.

The change unit 102 selects a placement destination added latest from unselected placement destinations (Step S302). When the selected placement destination is not the first placement destination in order of addition (No in Step S302), the change unit 102 performs set-value derivation processing of deriving a set value (i.e. a parameter) on the selected placement destination (Step S304). The set-value derivation processing in Step S304 is identical to the set-value derivation processing in Step S105 illustrated in FIG. 2. In the set-value derivation processing in Step S304, the change unit 102 may perform the operation illustrated in aforementioned FIG. 3.

Next, the determination unit 101 derives a characteristic value on the basis of the object information assigned to the received object (Step S305). As described above, a characteristic value in the present example embodiment is determined uniquely to a combination of object information and a placement destination.

The determination unit 101 compares the parameter, which is derived in Step S304, of the selected placement destination with the characteristic value derived in Step S305. When the derived characteristic value is smaller than the parameter of the selected placement destination (Yes in Step S306), the determination unit 101 determines the selected placement destination to be a placement destination in which the object is placed (Step S307). When the derived characteristic value is not smaller than the parameter of the selected placement destination (No in Step S306), the placement device 100 repeats the operations from Step S302.

When the selected placement destination is the first placement destination in order (Yes in Step S303), the determination unit 101 determines the selected placement destination to be a placement destination in which the object is placed (Step S307). A parameter derived for the first placement destination in the order is larger than the upper limit of a value that the characteristic value is able to take. In that case, the derived characteristic value is smaller than the parameter of the selected placement destination. Consequently, the selected placement destination is determined to be a placement destination in which the object is placed. Accordingly, when the selected placement destination is the first placement destination in the order, the determination unit 101 is able to omit the operations in Steps S304 to S306 as is the case with the operation illustrated in FIG. 5.

The placement unit 106 places the received object in the determined placement destination (Step S308).

Figure 6:
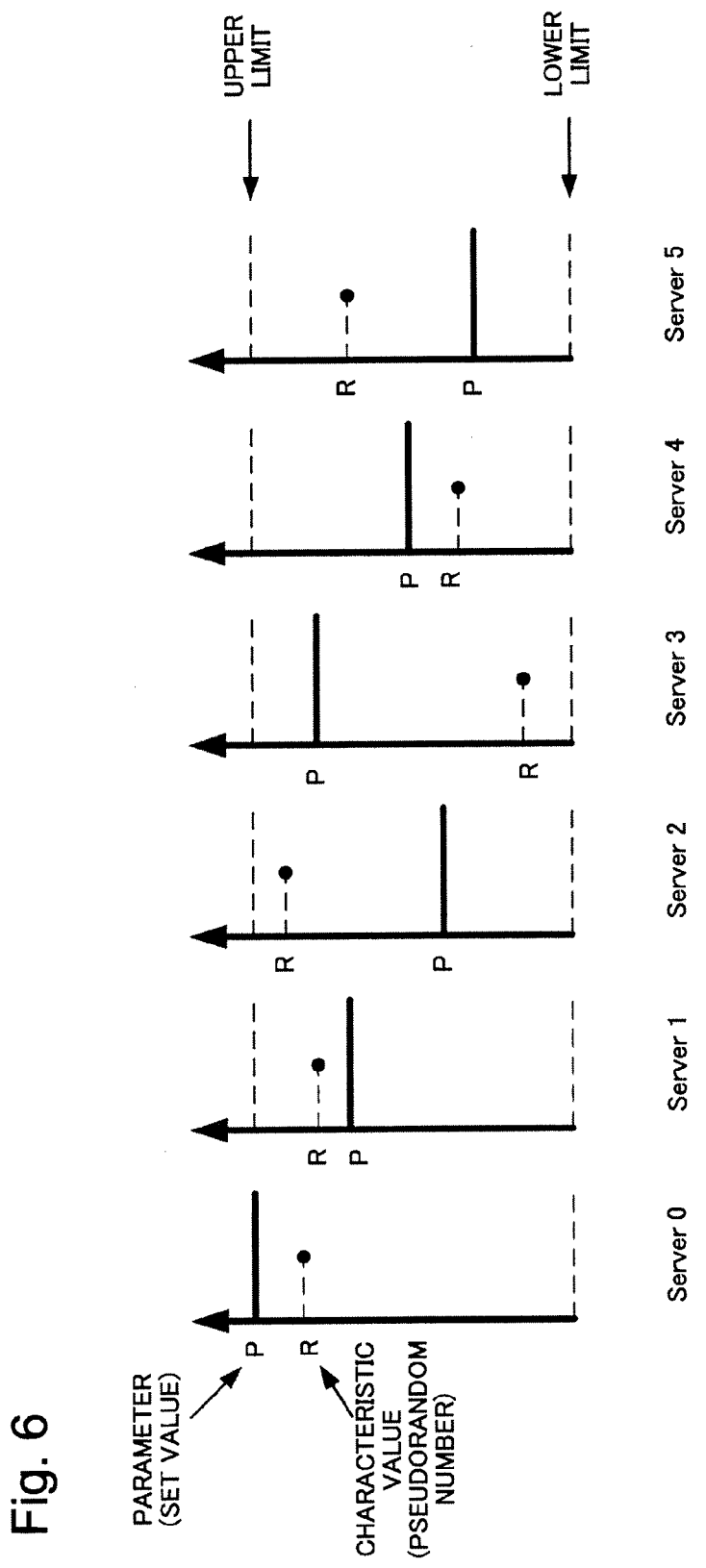
FIG. 6 is a diagram schematically representing an example of parameters and characteristic values.

FIG. 6 is a diagram schematically illustrating an example of a parameter and a characteristic value. In FIG. 6, Server 0 to Server 5 denote identifiers of placement destinations. A bar designated as "P" represents a magnitude of a parameter. A black dot designated as "R" represents a magnitude of a characteristic value. FIG. 6 schematically illustrates magnitudes of parameters and characteristic values of the placement destinations Server 0 to Server 5. A parameter of each of the placement destinations and a characteristic value of each of the placement destinations are distributed between an upper limit and a lower limit respectively represented by broken lines.

FIG. 7 is a diagram schematically illustrating a result of determination and the like by the determination unit 101. An "identifier" in FIG. 7 denotes an identifier of placement destination. Server 0 to Server 5 are identical to Server 0 to Server 5 illustrated in FIG. 6. "Order" denotes order in which a placement destinations are added to the placement system 10. A larger order value indicates that a placement destination to which the order value is assigned is added later. Server 5 is the placement destination added latest. "Value comparison" indicates whether or not P that is a parameter is larger than R that is a characteristic value. "Value comparison" illustrated in FIG. 7 represents a relation between a parameter and a characteristic value which are illustrated in FIG. 6. A circle in "placement destination of object" indicates a placement destination determined by the determination unit 101 to be a placement destination in which an object is placed.

In the examples illustrated in FIGS. 6 and 7, the placement destination added latest among placement destinations each having parameters and characteristic values that are smaller than or equal to the parameters is Server 4. Accordingly, as illustrated in FIG. 7, the determination unit 101 determines Server 4 to be a placement destination in which an object is placed.

Next, an operation of estimating a candidate of a placement destination in which an object is placed, by the placement device 100 according to the present example embodiment, will be described in detail with reference to drawings.

Figure 8:
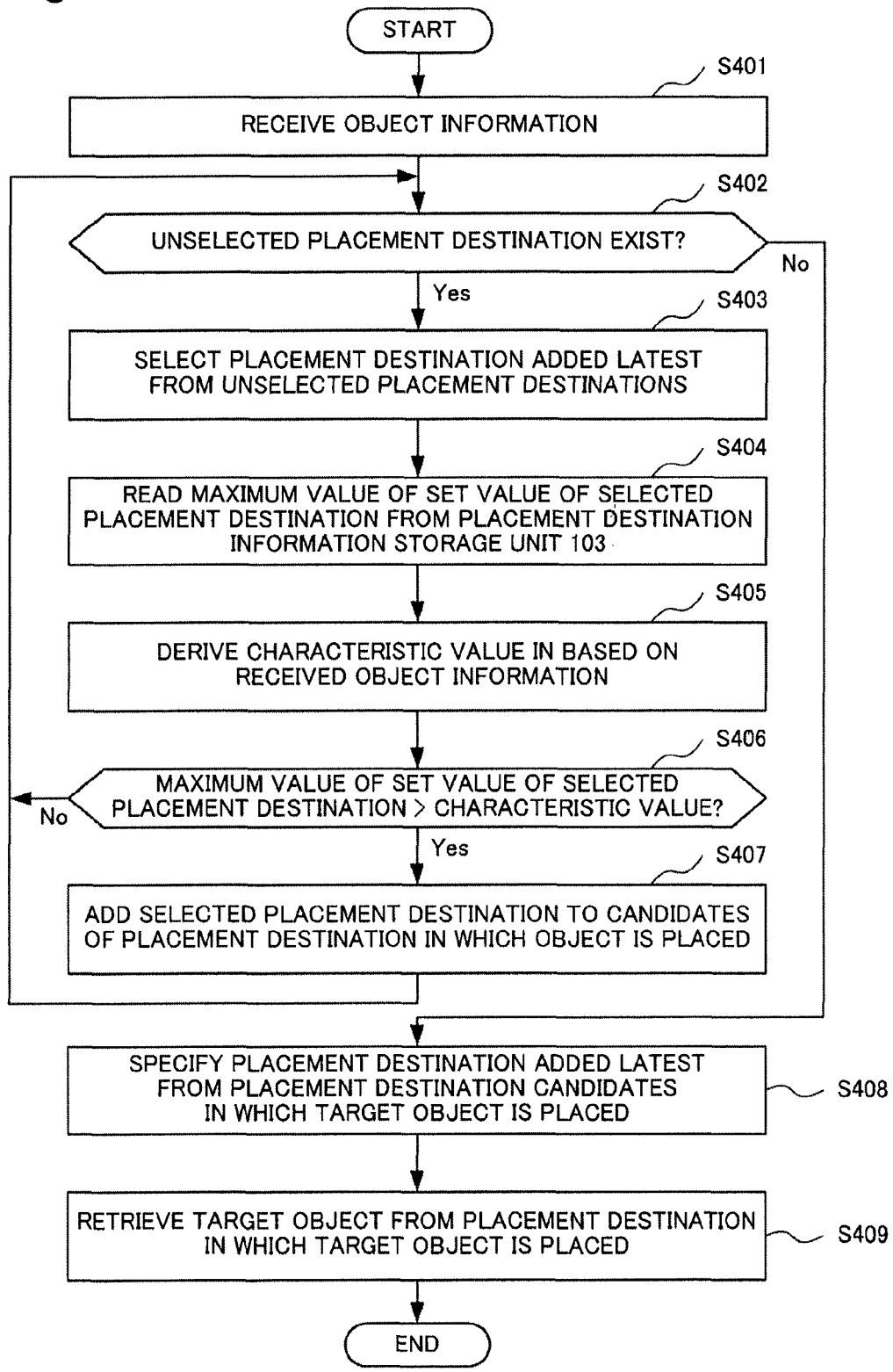
FIG. 8 is a flowchart representing an operation example of estimating a candidate of a placement destination in which an object is placed by the placement device 100 according to the first example embodiment.

FIG. 8 is a flowchart illustrating an operation example of estimating a candidate of a placement destination in which an object is placed, by the placement device 100 according to the present example embodiment. For example, when retrieving an object, the placement device 100 performs the operation of estimating a candidate of a placement destination in which the object to be retrieved is placed, as exemplified in FIG. 8.

First, the request processing unit 105 receives a retrieval request and object information from the instruction device 400 (Step S401). The request processing unit 105 which receives the retrieval request and the object information transmits a placement destination estimation instruction and the object information to the estimation unit 104. When the estimation unit 104 receives the placement destination estimation instruction, none of placement destinations is yet selected.

When an unselected placement destination exists (Yes in Step S402), the estimation unit 104 selects a placement destination added latest from unselected placement destinations (Step S403). The estimation unit 104 reads a maximum value of a parameter of the selected placement destination from the placement destination information storage unit 103 (Step S404). The estimation unit 104 derives a characteristic value on the basis of the received object information (Step S405). As described above, the characteristic value in the present example embodiment is determined uniquely to a combination of object information and a placement destination. Furthermore, the estimation unit 104 derives the characteristic value by the same method as that of the determination unit 101. The object information received along with the placement destination estimation instruction is object information assigned to an object placed in a placement destination determined by the determination unit 101. The characteristic value derived by the estimation unit 104 for a combination of the received object information and the selected placement destination is identical to the characteristic value derived by the determination unit 101 for the same combination when determining a placement destination of that to which the object information assigned.

The estimation unit 104 compares the maximum value of the parameter of the selected placement destination with the characteristic value derived in Step S405 (Step S406). When the maximum value of the parameter of the selected placement destination is not larger than the derived characteristic value (No in Step S406), the placement device 100 repeats the operations from Step S402. When the maximum value of the parameter of the selected placement destination is larger than the derived characteristic value (Yes in Step S406), the determination unit 101 may have determined the selected placement destination to be a placement destination of a target object. The target object is an object to which the received object information is assigned. Accordingly, when the maximum value of the parameter of the selected placement destination is larger than the derived characteristic value, the estimation unit 104 adds the selected placement destination to candidates of the placement destination in which the target object is placed (Step S407). After Step S407, the placement device 100 repeats the operations from Step S402.

When all the placement destinations are selected (No in Step S402), the estimation unit 104 ends the estimation of a candidate of the placement destination.

Next, the estimation unit 104 specifies a placement destination added latest from candidates of the placement destination in which the target object is placed (Step S408).

The estimation unit 104 may first make access to each of the placement destinations included in the candidates of the placement destination to inquire whether or not the target object specified by the received identifier of an object is placed. The estimation unit 104 may make the access through, for example, the request processing unit 105 and the reading unit 108. In response to the access, a placement destination in which the target object is placed may transmit to the estimation unit 104 a response indicating that the target object is placed. A placement destination in which the target object is not placed may return, for example, an error to the access. When the target object is placed in a plurality of placement destinations, the estimation unit 104 may further specify the placement destination added latest in the placement destinations each transmitting responses indicating that the target object is placed.

The estimation unit 104 may select the placement destination added latest from the candidates of the placement destination. The estimation unit 104 may make access to the selected placement destination to inquire whether or not the target object specified by the received identifier of an object is placed. When receiving a response indicating that the target object is placed from the selected placement destination, the estimation unit 104 may specify the placement destination to be the placement destination added latest. When not receiving a response indicating that the target object is placed from the selected placement destination, the estimation unit 104 may exclude the placement destination from the candidates of the placement destination. Then, the estimation unit 104 may repeat the operations from selection of the placement destination added latest.

The estimation unit 104 transmits, to the retrieval unit 108, an identifier of the placement destination in which the specified target object is placed.

The retrieval unit 108 retrieves the target object from the placement destination in which the target object is placed (Step S409). In Step S409, the retrieval unit 108 may retrieve the target object from a placement destination specified by the identifier of the placement destination, which is received from the estimation unit 104 through the request processing unit 105. When the target object is placed in a plurality of placement destinations, the placement destination specified by the estimation unit 104 is the placement destination that is latest in order of addition in the placement destinations in which the target object is placed. In that case, in Step S409, the retrieval unit 108 retrieves the target object from the placement destination that is latest in the order of addition in the placement destinations in which the target object is placed. Specifically, for example, the retrieval unit 108 may transmit a retrieval request for retrieving the target object to the placement destination that is latest in the order of addition in the placement destinations each transmitting responses each of which indicates that the target object is placed. The placement destination which receives the retrieval request may send the target object to the retrieval unit 108. The retrieval unit 108 may send the target object to the instruction device 400 through, for example, the request processing unit 105.

When an identical object (e.g. an object to which identical object information and an identical identifier are assigned) is placed a plurality of times, a placement destination determined to be a placement destination in which the object is placed may be possibly different depending on a combination of placement destinations existing at the time of the determination. That is to say, the identical object may be possibly placed in a plurality of placement destinations. When a target object is placed in a plurality of times while being updated, the object in the latest state is placed in the placement destination added latest in placement destinations in which the object is placed.

When a target object is placed in a plurality of placement destinations, in Step S408, as described above, the estimation unit 104 may specify the placement destination added latest in placement destinations in which the target object is placed as described above. Then, the retrieval unit 108 may retrieve the target object from the placement destination specified in Step S408. Thus, the retrieval unit 108 is able to retrieve the target object placed latest. Consequently, even when a target object is placed a plurality of times while being updated, the retrieval unit 108 is able to retrieve the latest target object. Further, in Step S408, the estimation unit 104 may make access, in inverse order of addition, to a placement destination included in the candidates of the placement destination to inquire whether or not the target object is placed. When receiving a response indicating that the target object is placed, the estimation unit 104 may end the access to inquire whether or not the target object is placed. Then, in Step S409, the retrieval unit 108 may retrieve the target object from the placement destination transmitting the response that the target object is placed.

For example, when P illustrated in FIG. 6 represents a maximum value of a parameter of each of the placement destinations, and Rs illustrated in FIG. 6 represent characteristic values derived on the basis of object information, placement destinations each having characteristic values smaller than or equal to the maximum values of the parameter are Server 0, Server 3, and Server 4, as illustrated in FIG. 7. Accordingly, the candidates of the placement destination, which are estimated by the estimation unit 104, are Server 0, Server 3, and Server 4, as illustrated in FIG. 7.

The device described in aforementioned PTL 1 satisfies the following features.

Feature 1: A placement destination in which an object is placed is uniquely determined on the basis of a value derived by using an identifier of the object and information associating the placement destination with a range of the value.

Feature 2: Objects are placed in all placement destinations.

Feature 3: Even when a placement destination is added, objects are placed nearly uniformly in all the placement destinations. Only minimum essentials of objects are moved in order to place objects uniformly.

The placement device 100 according to the present example embodiment has the aforementioned features 1 and 2. Additionally, the placement device 100 provides a state in which objects are nearly uniformly placed in each of the placement destinations as the number of objects which are placed increase, without moving an object depending on addition of a placement destination.

In the description above, an object is a chunk of data. However, an object may be, for example a physical body or the like. In that case, each of the placement destinations may have a location to place an object. Further, the placement unit 106 may be a conveyor capable of conveying an object to each of the placement destinations. The retrieval unit 108 may be a conveyor capable of conveying an object from each of the placement destinations.

The present example embodiment described above provides a first effect that, in a case where a placement destination, which is determined in accordance with a rule and in which an object is placed, is changed by addition of a placement destination, a processing cost related to placement of an object can be reduced.

The reason is that the change unit 102 changes, on the basis of a free capacity in each of the placement destinations, a rule uniquely determining a placement destination in which an object is placed so that a placement destination determined by the rule does not change to a placement destination other than the placement destination added latest. Then, the determination unit 101 determines a placement destination of an object in accordance with the rule changed by the change unit 102.

In a case where relocation of a placed object is not performed, when an object is retrieved, a placement destination in which the object to be retrieved is placed needs to be specified. Specifying the placement destination in which the object to be retrieved is placed is performed by, for example, confirming whether or not the object exists in each of the placement destinations in which the object is possibly placed. According to the present example embodiment, compared with a case where the placement destination in which the object is placed may be changed, by addition of a placement destination, to any placement destination existing at the addition of the placement destination, the number of placement destinations possibly determined to be the placement destination in which the object is placed is limited. Accordingly, when relocation of a placed object is not performed, a rise in a processing cost of specifying the placement destination of the object to be retrieved can be reduced. In other words, in this case, the placement device 100 according to the present example embodiment is able to reduce a rise in a processing cost of specifying a placement destination of an object to be retrieved, in addition to reducing a processing cost of relocating an object due to addition of a placement destination.

Further, even when a rule is changed by the change unit 102 according to the present example embodiment, a placement destination, which is determined on the basis of object information in accordance with the rule changed on the basis of a free capacity in each of the placement destinations, of the object does not change to a placement destination other than a newly added placement destination. In other words, the change unit 102 changes the aforementioned rule so that change of a placement destination of an object due to addition of a placement destination is minimized. When a free capacity in each of the placement destinations after relocation is equal, an amount of object to be relocated is small in a case where an object is relocated only to the placement destination added latest, compared with a case where an object is relocated between placement destinations other than the placement destination added latest. In other words, when a previously placed object is relocated in accordance with a rule changed by the change unit 102 according to the present example embodiment due to addition of a placement destination, a minimum amount of object is relocated. Accordingly, when relocating an object on the basis of change of a rule uniquely determining a placement destination of an object, the placement device 100 according to the present example embodiment is able to reduce a processing cost of relocation of an object.

The present example embodiment provides a second effect that, when a placement destination which is determined according to a rule and in which an object is placed is changed due to addition of a placement destination, objects can be equally or nearly equally placed to each of the placement destinations without relocating an already placed object.

The reason is that the change unit 102 changes, on the basis of a free capacity in each of the placement destinations, a rule uniquely determining a placement destination of an object. For example, the change unit 102 changes the rule so that the rule determines objects to be placed in a ratio proportional to a free capacity in each of the placement destinations. Thus, without relocating an object already placed in any of the placement destinations, the number of objects placed in each of the placement destinations becomes equal or nearly equal as the number of placed objects increases.

The present example embodiment further has a second effect that a maximum time required for determining a placement destination of an object can be shortened.

The reason is that the determination unit 101 according to the present example embodiment determines a placement destination in which an object is placed by repeating processing of determining whether or not a selected placement destination is a placement destination in which the object is placed. The number of times of the processing does not exceed the number of placement destinations at the start of the processing. As described above, a time required for the device according to PTL 1 to determine a placement destination may be extended by chance. However, according to the present example embodiment, even when the number of times of the aforementioned processing increases by chance, the upper limit of the number of times is the number of placement destinations. Accordingly, the placement device 100 according to the present example embodiment is able to shorten a maximum time required for determining a placement destination of an object.

<Modified Example of First Example Embodiment>

Figure 9:
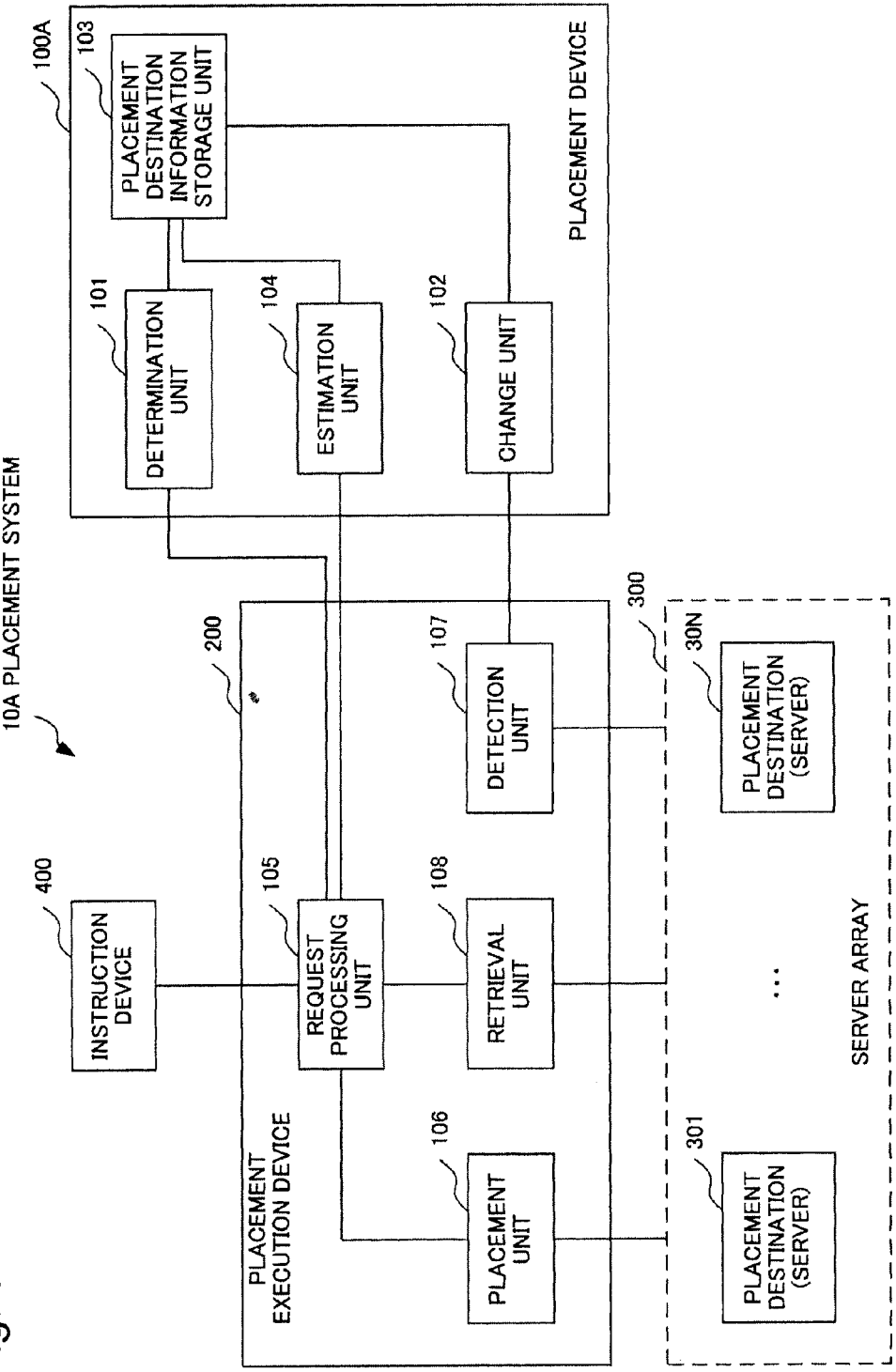
FIG. 9 is a block diagram representing a configuration example of a placement system 10A according to a modified example of the first example embodiment.

FIG. 9 is a block diagram illustrating a configuration example of a placement system 10A according to a modified example of the first example embodiment. The placement system 10A includes a placement device 100A, a placement execution device 200, and a server array 300. The placement execution device 200 is communicably connected to each of the placement device 100A, placement destinations included in the server array 300, and an instruction device 400. The server array 300 and the instruction device 400 are identical to the server array 300 and the instruction device 400 according to the first example embodiment. Elements of the placement device 100A are identical to elements to which identical reference signs are assigned included in the placement determination unit 110 of the placement device 100 according to the first example embodiment. Elements of the placement execution device 200 are identical to elements to which identical reference signs are assigned of the placement device 100 according to the first example embodiment. However, the determination unit 101 transmits an identifier of a determined placement destination to the placement unit 106 through, for example, the request processing unit 105. The placement unit 106 may receive, from the request processing unit 105, a placement instruction that is an instruction to place an object, an identifier of a placement destination determined by the determination unit 101, and an object to be placed in the placement destination. The estimation unit 104 transmits a candidate of placement destination to the retrieval unit 108 through, for example the request processing unit 105. The estimation unit 104 transmits an identifier of a specified placement destination in which a handling object is placed to the retrieval unit 108 through the request processing unit 105. In other words, the estimation unit 104, for example, transmits the identifier of the specified placement destination to the request processing unit 105. The request processing unit 105 transmits, to the retrieval unit 108, a retrieval request, an identifier of an object to be retrieved, and the identifier of the specified placement destination. An object is not sent through neither the determination unit 101 nor the estimation unit 104 which are included in the placement device 100A. An object is sent between the request processing unit 105, and the placement unit 106 or the retrieval unit 108. The placement system 10A according to the present modified example performs the same operations as those performed by the placement system 10 according to the first example embodiment.

<Second Example Embodiment>

Next, a second example embodiment of the present invention will be described in detail with reference to drawings.

Figure 10:
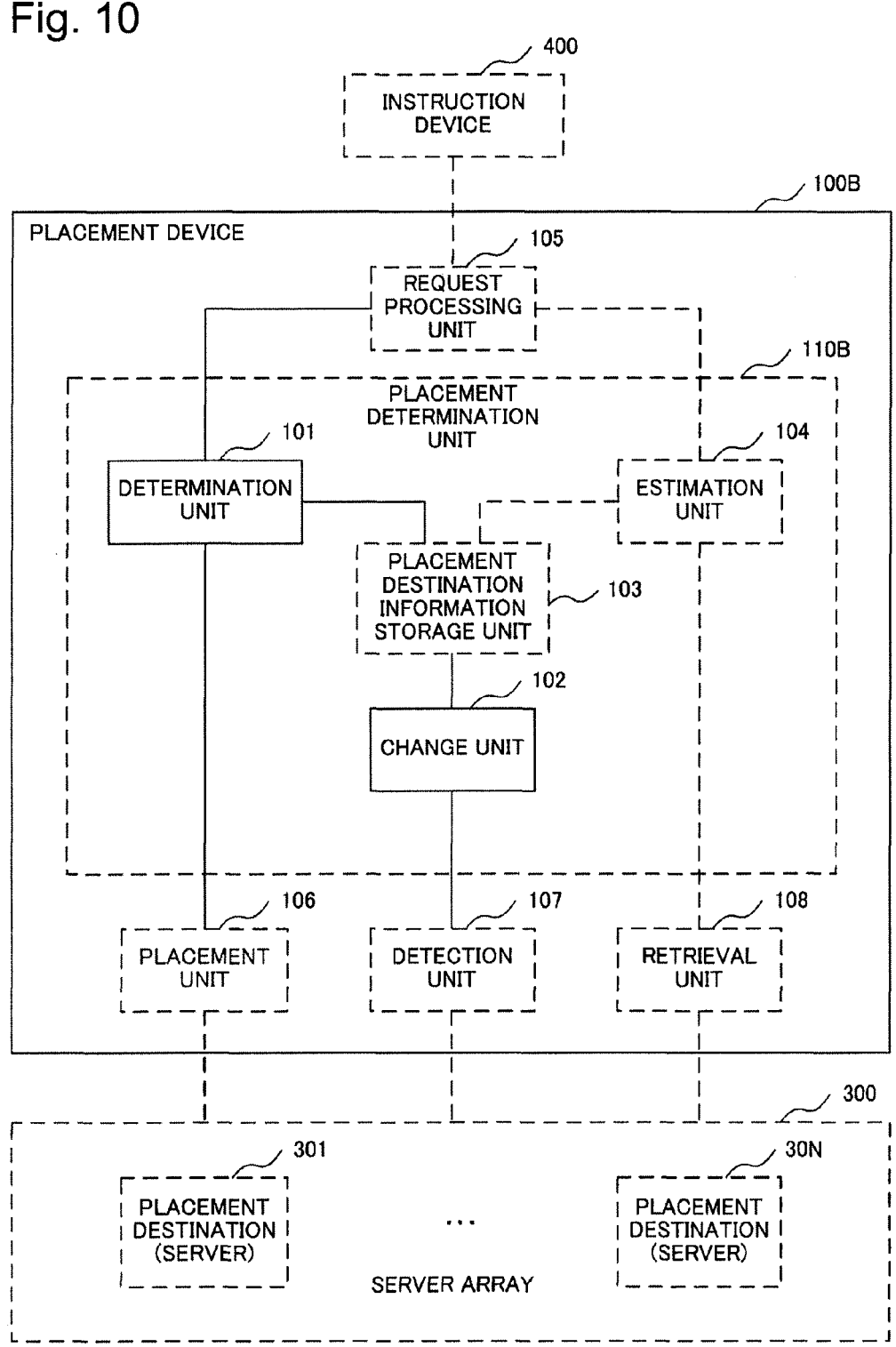
FIG. 10 is a diagram representing a configuration example of a placement device 100B according to a second example embodiment of the present invention.

FIG. 10 is a diagram illustrating a configuration example of a placement device 100B according to the present example embodiment.

Referring to FIG. 10, the placement device 100B according to the present example embodiment includes the determination unit 101 and the change unit 102. Upon receiving object information assigned to an object, from one or more placement destinations, the determination unit 101 determines the placement destination in which the object is placed. To each of the placement destinations, a set value is assigned. The object may be placed in a placement destination. A placement destination determined by the determination unit 101 to be the placement destination in which the object is placed is the placement destination to which the set value larger than a characteristic value uniquely derived on the basis of the object information is assigned, and which is added latest. The change unit 102 changes the set value assigned to at least one of the placement destinations so that the placement destination determined does not change to the placement destination other than the placement destination added latest due to addition of the placement destination. The change unit 102 changes the set value assigned to at least one of the placement destinations, on the basis of a free capacity, which indicates an amount of the object, available for placing the object newly in the placement destinations.

In the example illustrated in FIG. 10, the determination unit 101 and the change unit 102 are drawn in a placement determination unit 110B. The placement determination unit 110B may be a device communicably connected to the placement execution device 200 similarly to the placement device 100A illustrated in FIG. 9.

The present example embodiment described above has the same effects as those provided by the first example embodiment. The reason is same as the reason for the effects according to the first example embodiment being provided.

<Another Example Embodiment>

Each of the placement device 100, the placement device 100A, the placement device 100B, and the placement execution device 200 may be achieved by a computer and a program controlling the computer, or dedicated hardware. The placement device 100, the placement device 100A, the placement device 100B, and the placement execution device 200 may also be achieved by a combination of a computer with a program controlling the computer, and dedicated hardware.

Figure 11:
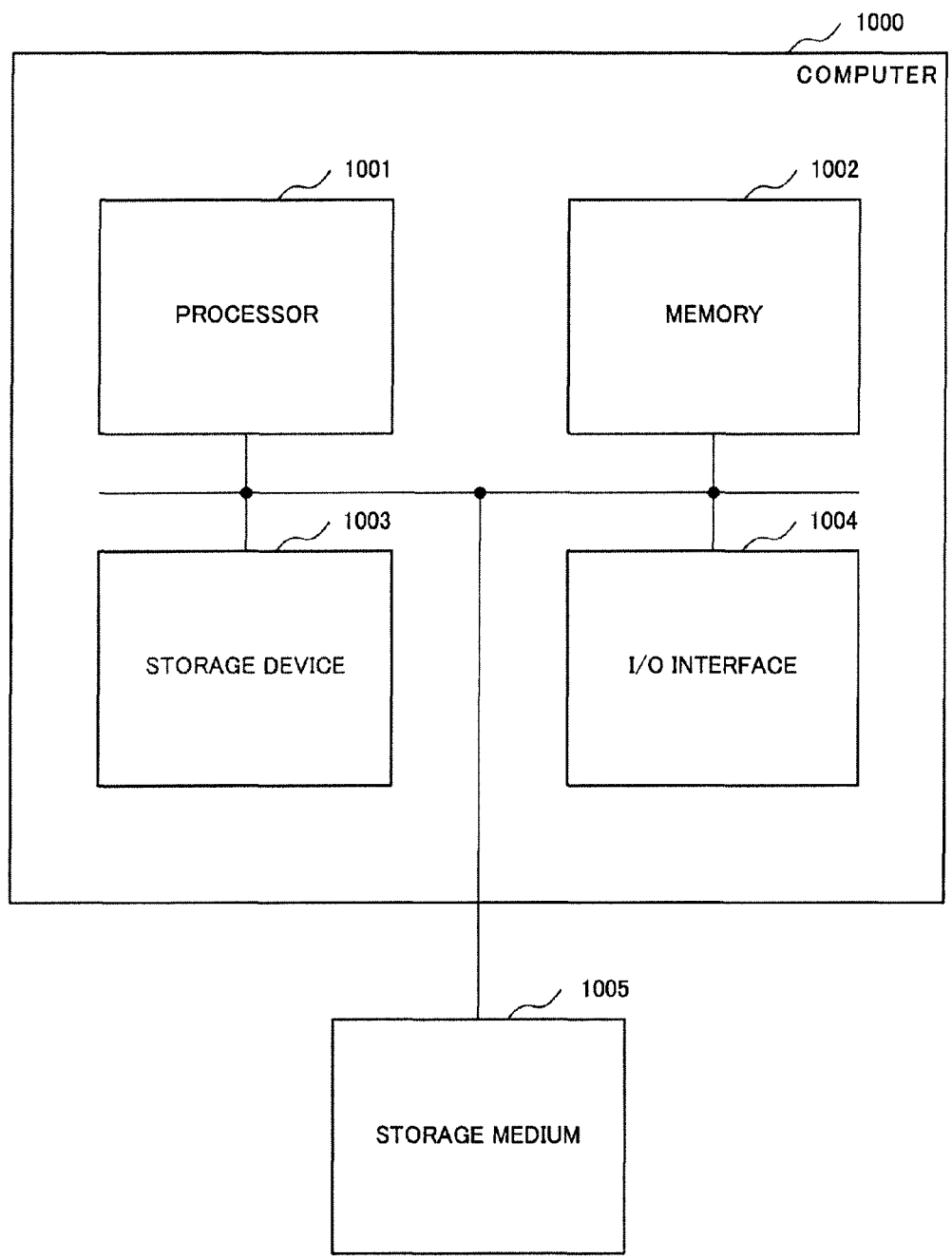
FIG. 11 is a diagram representing an example of a hardware configuration of a computer 1000 capable of providing the placement device and a placement execution device according to the example embodiments of the present invention.

FIG. 11 is a diagram illustrating an example of a hardware configuration of a computer 1000 capable of achieving the placement device 100, the placement device 100A, the placement device 100B, and the placement execution device 200. Referring to FIG. 11, the computer 1000 includes a processor 1001, a memory 1002, a storage device 1003, and an input/output (I/O) interface 1004. Further, the computer 1000 is able to access a storage medium 1005. The memory 1002 and the storage device 1003 are, for example, storage devices such as a random access memory (RAM) and a hard disk. The storage medium 1005 is, for example, a storage device such as a RAM and a hard disk, a read only memory (ROM), and a portable storage medium. The storage device 1003 may be the storage medium 1005. The processor 1001 is able to read and write data and a program from and to the memory 1002 and the storage device 1003. The processor 1001 is able to access, for example, the instruction device 400 and each of the placement destinations through the I/O interface 1004. The processor 1001 is able to access the storage medium 1005. The storage medium 1005 stores a program causing the computer 1000 to operate as the placement device 100, the placement device 100A, the placement device 100B, or the placement execution device 200.

The processor 1001 loads into the memory 1002 a program, which is stored in the storage medium 1005, causing the computer 1000 to operate as the placement device 100, the placement device 100A, the placement device 100B, or the placement execution device 200. Then, by the processor 1001 executing the program loaded in the memory 1002, the computer 1000 operates as the placement device 100, the placement device 100A, the placement device 100B, or the placement execution device 200.

Units included in the following group can be provided by, for example, a dedicated program, which is loaded into the memory 1002 from the storage medium 1005 storing the program and is capable of achieving a function of each unit, and the processor 1001 executing the program. The aforementioned group includes the determination unit 101, the change unit 102, the estimation unit 104, the request processing unit 105, the placement unit 106, the detection unit 107, and the retrieval unit 108. Further, the placement destination information storage unit 103 can be achieved by the memory 1002 and the storage device 1003 such as a hard disk device which are included in the computer 1000. Alternatively, a part or a whole of the units included in the aforementioned group and the placement destination information storage unit 103 may be achieved by a dedicated circuit achieving the function of the units.

The whole or part of the example embodiments disclosed above can be described as, but not limited to, the following supplementary notes.

(Supplementary Note 1)

A placement device including:

determination means for determining, upon receiving object information assigned to an object, a placement destination in which the object is placed from among one or more placement destinations to each of which a set value is assigned, the placement destinations being available for placing the object, the placement destination being added latest among the placement destinations to each of which the set value not smaller than a characteristic value is assigned, the characteristic value being uniquely derived based on the object information; and change means for changing, when an placement destination is added, the set value assigned to at least one of the placement destination based on free capacities available for placing objects newly in the placement destinations so that the placement destination to be determined does not change to other than the placement destination added latest, the free capacity representing an amount of the objects.

(Supplementary Note 2)

The placement device according to Supplementary Note 1, wherein, the change means derives the set value assigned to a target placement destination in the placement destinations based on a free capacity which is available for placing objects in the target placement destination and which represents an amount of the objects and on a sum of the free capacities of the placement destinations except for a placement destination added after the target placement destination is added, and changes the set value assigned to the target placement destination to the set value derived.

(Supplementary Note 3)

The placement device according to Supplementary Note 2, wherein the change means derives the set value assigned to the target placement destination so that the set value assigned to a placement destination becomes larger as a free capacity in the placement destination becomes larger, and that the set value becomes smaller as a sum of the free capacities in the placement destinations added before the target placement destination is added becomes larger.

(Supplementary Note 4)

The placement device according to Supplementary Note 2 or 3, wherein, when the set value derived for a placement destination in the placement destinations is larger than a maximum value of the set value of the placement destination, the set value being stored in placement destination information storage means, the changing means stores the set value derived in the placement destination information storage means as the maximum value of the set value of the placement destination, and the placement device further includes:

estimation means for, upon receiving the object information, specifying, as candidates of a placement destination in which the object to which the object information is assigned is placed, all the placement destinations whose maximum values of the set values are larger than the characteristic value derived based on the attribute.

(Supplementary Note 5)

The placement device according to Supplementary Note 4, wherein the estimation means further specifies the placement destination being added latest among the placement destinations which are included in the estimated candidates of the placement destination and in which the object is placed, and the placement device further includes:

retrieval means for retrieving the object from the specified placement destination.

(Supplementary Note 6)

The placement device according to any one of Supplementary Notes 2 to 5, wherein the determination means derives the characteristic value based on the object information assigned to the object so that a plurality of characteristic values derived from a plurality of different pieces of object information are uniformly or almost uniformly distributed between a maximum value and a minimum value which are predetermined, and, the change means derives the set value assigned to a placement destination in the placement destinations so that a ratio of a difference between the set value of the placement destination and the minimum value to a difference between the maximum value and the minimum value is a ratio of the free capacity in the placement destination to a sum of the free capacities in the placement destinations at a time when the placement destination is added.

(Supplementary Note 7)

The placement device according to any one of Supplementary Notes 1 to 6, further including:

placement means for placing the object in the placement destination determined to be the placement destination in which the object is placed.

(Supplementary Note 8)

A placement system including the placement device according to any one of Supplementary Notes 1 to 7, including:

each of the placement destinations.

(Supplementary Note 9)

A placement method including:

determining, upon receiving object information assigned to an object, a placement destination in which the object is placed out of one or more placement destinations to each of which a set value is assigned, the placement destinations being available for placing the object, the placement destination being added latest among the placement destinations to each of which the set value larger than a characteristic value is assigned, the characteristic value being uniquely derived based on the object information; and changing, when an placement destination is added, the set value assigned to at least one of the placement destination based on free capacities available for placing objects newly in the placement destinations so that the placement destination to be determined does not change to other than the placement destination added latest, the free capacity representing an amount of the objects.

(Supplementary Note 10)

The placement method according to Supplementary Note 9, further including:

deriving the set value assigned to a target placement destination in the placement destinations based on a free capacity which is available for placing objects in the target placement destination and which represents an amount of the objects and on a sum of the free capacities of the placement destinations except for the placement destination added after the target placement destination is added, and changing the set value assigned to the target placement destination to the set value derived.

(Supplementary Note 11)

The placement method according to Supplementary Note 10, further including deriving the set value assigned to the target placement destination so that the set value assigned to a placement destination becomes larger as a free capacity in the placement destination becomes larger, and that the set value becomes smaller as a sum of the free capacities in the placement destinations added before the target placement destination is added becomes larger.

(Supplementary Note 12)

The placement method according to Supplementary Note 10 or 11, further including:

when the set value derived for a placement destination in the placement destinations is larger than a maximum value of the set value of the placement destination, the set value being stored in placement destination information storage means, storing the set value derived in the placement destination information storage means as the maximum value of the set value of the placement destination; and upon receiving the object information, specifying, as candidates of a placement destination in which the object to which the object information is assigned is placed, all the placement destinations whose maximum values of the set values are larger than the characteristic value derived based on the attribute.

(Supplementary Note 13)

The placement method according to Supplementary Note 12, further including:

specifying the placement destination being added latest among the placement destinations which are included in the estimated candidates of the placement destination and in which the object is placed; and retrieving, by the placement device, the object from the specified placement destination.

(Supplementary Note 14)

The placement method according to any one of Supplementary Notes 10 to 13, further including:

deriving the characteristic value based on the object information assigned to the object so that a plurality of characteristic values derived from a plurality of different pieces of object information are uniformly or almost uniformly distributed between a maximum value and a minimum value which are predetermined; and, deriving the set value assigned to a placement destination in the placement destinations so that a ratio of a difference between the set value of the placement destination and the minimum value to a difference between the maximum value and the minimum value is a ratio of the free capacity in the placement destination to a sum of the free capacities in the placement destinations at a time when the placement destination is added.

(Supplementary Note 15)

The placement method according to any one of Supplementary Notes 9 to 14, further including:

placing the object in the placement destination determined to be the placement destination in which the object is placed.

(Supplementary Note 16)

A storage medium that stores a placement program causing a computer to operate as:

determination means for determining, upon receiving object information assigned to an object, a placement destination in which the object is placed out of one or more placement destinations to each of which a set value is assigned, the placement destinations being available for placing the object, the placement destination being added latest among the placement destinations to each of which the set value larger than a characteristic value is assigned, the characteristic value being uniquely derived based on the object information; and change means for changing, when an placement destination is added, the set value assigned to at least one of the placement destination based on free capacities available for placing objects newly in the placement destinations so that the placement destination to be determined does not change to other than the placement destination added latest, the free capacity representing an amount of the objects.

(Supplementary Note 17)

The storage medium according to Supplementary Note 16, storing the placement program causing a computer to operate as:

the change means that derives the set value assigned to a target placement destination in the placement destinations based on a free capacity which is available for placing objects in the target placement destination and which represents an amount of the objects, and on a sum of the free capacities of the placement destinations except for a placement destination added after the target placement destination is added, and changing the set value assigned to the target placement destination to the set value derived.

(Supplementary Note 18)

The storage medium according to Supplementary Note 17, storing the placement program causing a computer to operate as:

the change means that derives the set value assigned to the target placement destination so that the set value assigned to a placement destination becomes larger as a free capacity in the placement destination becomes larger, and the set value becomes smaller as a sum of the free capacities in the placement destinations added before the target placement destination is added becomes larger.

(Supplementary Note 19)

The storage medium according to Supplementary Note 17 or 18, storing the placement program causing a computer to operate as:

the change means that stores, when the set value derived for a placement destination in the placement destinations is larger than a maximum value of the set value of the placement destination, the set value being stored in placement destination information storage means, the set value derived in the placement destination information storage means as the maximum value of the set value of the placement destination; and estimation means for, upon receiving the object information, specifying, as candidates of a placement destination in which the object to which the object information is assigned is placed, all the placement destinations whose maximum values of the set values are larger than the characteristic value derived based on the attribute.

(Supplementary Note 20)

The storage medium according to Supplementary Note 19, storing the placement program causing a computer to operate as:

the estimation means that further specifies the placement destination being added latest among the placement destinations which are included in the estimated candidates of the placement destination and in which the object is placed; and retrieval means for retrieving the object from the specified placement destination.

(Supplementary Note 21)

The storage medium according to any one of Supplementary Notes 17 to 20, storing the placement program causing a computer to operate as:

the determination means that derives the characteristic value based on the object information assigned to the object so that a plurality of characteristic values derived from a plurality of different pieces of object information are uniformly or almost uniformly distributed between a maximum value and a minimum value which are predetermined; and, the change means that derives the set value assigned to a placement destination in the placement destinations so that a ratio of a difference between the set value of the placement destination and the minimum value to a difference between the maximum value and the minimum value is a ratio of the free capacity in the placement destination to a sum of the free capacities in the placement destinations at a time when the placement destination is added.

(Supplementary Note 22)

The storage medium according to any one of Supplementary Notes 16 to 21, storing the placement program causing a computer to operate as:

placement means for placing the object in the placement destination determined to be the placement destination in which the object is placed.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application claims priority based on Japanese Patent Application No. 2014-143324 filed on Jul. 11, 2014, the disclosure of which is hereby incorporated by reference thereto in its entirety.

REFERENCE SIGNS LIST

10 Placement system
10A Placement system
100 Placement device
100A Placement device
100B Placement device
101 Determination unit
102 Change unit
103 Placement destination information storage unit
104 Estimation unit
105 Request processing unit
106 Placement unit
107 Detection unit
108 Retrieval unit
110 Placement determination unit
110B Placement determination unit
200 Placement execution device
300 Server array
301 Placement destination (Server)
30N Placement destination (Server)
400 Instruction device
1000 Computer
1001 Processor
1002 Memory
1003 Storage device
1004 I/O interface

The invention claimed is:

1. A placement device comprising:
a memory that stores a set of instructions; and
at least one processor configured to execute the set of instructions to:
determine, upon receiving object information assigned to an object, a placement destination in which the object is placed from among one or more placement destinations to each of which a set value is assigned, the placement destinations being available for placing the object, the placement destination being added latest among the placement destinations to each of which the set value not smaller than a characteristic value is assigned, the characteristic value being uniquely derived based on the object information; and
change, when a placement destination is added, the set value assigned to at least one of the placement destination based on free capacities available for placing objects newly in the placement destinations so that the placement destination to be determined does not change to other than the placement destination added latest, the free capacity representing an amount of the objects.

2. The placement device according to claim 1, wherein, the at least one processor is configured to:
derive the set value assigned to a target placement destination in the placement destinations based on a free capacity which is available for placing objects in the target placement destination and which represents an amount of the objects and on a sum of the free capacities of the placement destinations except for a placement destination added after the target placement destination is added, and change the set value assigned to the target placement destination to the set value derived.

3. The placement device according to claim 2, wherein the at least one processor is configured to:
derive the set value assigned to the target placement destination so that the set value assigned to a placement destination becomes larger as a free capacity in the placement destination becomes larger, and that the set value becomes smaller as a sum of the free capacities in the placement destinations added before the target placement destination is added becomes larger.

4. The placement device according to claim 2, wherein the at least one processor is configured to:
store, when the set value derived for a placement destination in the placement destinations is larger than a maximum value of the set value of the placement destination, the set value being stored in placement destination information storage, the set value derived in the placement destination information storage as the maximum value of the set value of the placement destination, and
specify, upon receiving the object information, as candidates of a placement destination in which the object to which the object information is assigned is placed, all the placement destinations whose maximum values of the set values are larger than the characteristic value derived based on the attribute.

5. The placement device according to claim 4, wherein the at least one processor is configured to:
specify the placement destination being added latest among the placement destinations which are included in the estimated candidates of the placement destination and in which the object is placed, and
retrieve the object from the specified placement destination.

6. The placement device according claim 2, wherein the at least one processor is configured to:
derive the characteristic value based on the object information assigned to the object so that a plurality of characteristic values derived from a plurality of different pieces of object information are uniformly or almost uniformly distributed between a maximum value and a minimum value which are predetermined, and,
derive the set value assigned to a placement destination in the placement destinations so that a ratio of a difference between the set value of the placement destination and the minimum value to a difference between the maximum value and the minimum value is a ratio of the free capacity in the placement destination to a sum of the free capacities in the placement destinations at a time when the placement destination is added.

7. The placement device according to claim 1, wherein the at least one processor is configured to:
place the object in the placement destination determined to be the placement destination in which the object is placed.

8. A placement system including the placement device according to claim 1, comprising:
each of the placement destinations.

9. A placement method comprising:
determining, upon receiving object information assigned to an object, a placement destination in which the object is placed out of one or more placement destinations to each of which a set value is assigned, the placement destinations being available for placing the object, the placement destination being added latest among the placement destinations to each of which the set value larger than a characteristic value is assigned, the characteristic value being uniquely derived based on the object information; and changing, when an placement destination is added, the set value assigned to at least one of the placement destination based on free capacities available for placing objects newly in the placement destinations so that the placement destination to be determined does not change to other than the placement destination added latest, the free capacity representing an amount of the objects.

10. The placement method according to claim 9, further comprising:

deriving the set value assigned to a target placement destination in the placement destinations based on a free capacity which is available for placing objects in the target placement destination and which represents an amount of the objects and on a sum of the free capacities of the placement destinations except for the placement destination added after the target placement destination is added, and changing the set value assigned to the target placement destination to the set value derived.

11. The placement method according to claim 10, further comprising deriving the set value assigned to the target placement destination so that the set value assigned to a placement destination becomes larger as a free capacity in the placement destination becomes larger, and that the set value becomes smaller as a sum of the free capacities in the placement destinations added before the target placement destination is added becomes larger.

12. The placement method according to claim 10, further comprising:

when the set value derived for a placement destination in the placement destinations is larger than a maximum value of the set value of the placement destination, the set value being stored in placement destination information storage, storing the set value derived in the placement destination information storage as the maximum value of the set value of the placement destination; and upon receiving the object information, specifying, as candidates of a placement destination in which the object to which the object information is assigned is placed, all the placement destinations whose maximum values of the set values are larger than the characteristic value derived based on the attribute.

13. The placement method according to claim 12, further comprising:

specifying the placement destination being added latest among the placement destinations which are included in the estimated candidates of the placement destination and in which the object is placed; and retrieving, by the placement device, the object from the specified placement destination.

14. A non-transitory computer-readable storage medium that stores a placement program causing a computer to operate as:

determination processing of determining, upon receiving object information assigned to an object, a placement destination in which the object is placed out of one or more placement destinations to each of which a set value is assigned, the placement destinations being available for placing the object, the placement destination being added latest among the placement destinations to each of which the set value larger than a characteristic value is assigned, the characteristic value being uniquely derived based on the object information; and change processing of changing, when a placement destination is added, the set value assigned to at least one of the placement destination based on free capacities available for placing objects newly in the placement destinations so that the placement destination to be determined does not change to other than the placement destination added latest, the free capacity representing an amount of the objects.

15. The non-transitory computer-readable storage medium according to claim 14, storing the placement program causing a computer to operate as:

the change processing that derives the set value assigned to a target placement destination in the placement destinations based on a free capacity which is available for placing objects in the target placement destination and which represents an amount of the objects placement destination, and on a sum of the free capacities of the placement destinations except for a placement destination added after the target placement destination is added, and changing the set value assigned to the target placement destination to the set value derived.

16. The non-transitory computer-readable storage medium according to claim 15, storing the placement program causing a computer to operate as:

the change processing that derives the set value assigned to the target placement destination so that the set value assigned to a placement destination becomes larger as a free capacity in the placement destination becomes larger, and the set value becomes smaller as a sum of the free capacities in the placement destinations added before the target placement destination is added becomes larger.

17. The non-transitory computer-readable storage medium according to claim 15, storing the placement program causing a computer to operate as:

the change processing that stores, when the set value derived for a placement destination in the placement destinations is larger than a maximum value of the set value of the placement destination, the set value being stored in placement destination information storage, the set value derived in the placement destination information storage as the maximum value of the set value of the placement destination; and estimation processing of specifying, upon receiving the object information, as candidates of a placement destination in which the object to which the object information is assigned is placed, all the placement destinations whose maximum values of the set values are larger than the characteristic value derived based on the attribute.

18. The non-transitory computer-readable storage medium according to claim 17, storing the placement program causing a computer to operate as:

the estimation processing that further specifies the placement destination being added latest among the placement destinations which are included in the estimated candidates of the placement destination and in which the object is placed; and retrieval processing of retrieving the object from the specified placement destination.

* * * * *